US011289947B2

(12) United States Patent
Harakawa

(10) Patent No.: US 11,289,947 B2
(45) Date of Patent: Mar. 29, 2022

(54) ELECTRIC POWER TRANSMISSION SYSTEM, AND MANUFACTURING METHOD FOR ELECTRIC POWER TRANSMISSION SYSTEM

(71) Applicants: ExH Corporation, Chiba (JP); KYOEI ELECTRIC CO., Ltd., Osaka (JP)

(72) Inventor: Kenichi Harakawa, Inzai (JP)

(73) Assignees: ExH Corporation, Chiba (JP); KYOEI ELECTRIC CO., Ltd., Osaka (JP)

(*) Notice: Subject to any disclaimer, the term of this patent is extended or adjusted under 35 U.S.C. 154(b) by 190 days.

(21) Appl. No.: 16/642,350

(22) PCT Filed: Aug. 29, 2018

(86) PCT No.: PCT/JP2018/031937
§ 371 (c)(1),
(2) Date: Feb. 26, 2020

(87) PCT Pub. No.: WO2019/044900
PCT Pub. Date: Mar. 7, 2019

(65) Prior Publication Data
US 2020/0280209 A1     Sep. 3, 2020

(30) Foreign Application Priority Data

Aug. 29, 2017  (JP) .............................. JP2017-164589

(51) Int. Cl.
*H02J 50/00*   (2016.01)
*H02J 50/05*   (2016.01)
(Continued)

(52) U.S. Cl.
CPC ............ *H02J 50/05* (2016.02); *H01F 7/0247* (2013.01); *H02J 50/40* (2016.02); *H02K 1/2793* (2013.01);
(Continued)

(58) Field of Classification Search
CPC ...... H02K 16/025; H02K 16/02; H02K 16/04; H02K 16/00; H02K 1/27; H02K 1/2793;
(Continued)

(56) References Cited

U.S. PATENT DOCUMENTS 405,858 A * 6/1889 Tesla ..................... H02K 23/04
310/159
2,674,729 A * 4/1954 Carter ................... H02K 24/00
324/660
(Continued)

FOREIGN PATENT DOCUMENTS

JP   2014-007200 A   1/2014
JP   2015-099880 A   5/2015
(Continued)

OTHER PUBLICATIONS

International Search Report issued in PCT/JP2018/031937; dated Nov. 13, 2018.
(Continued)

*Primary Examiner* — Maged M Almawri
(74) *Attorney, Agent, or Firm* — Studebaker & Brackett PC

(57) ABSTRACT

In the present invention, junction capacitance is increased by stabilizing the junction capacitance of rotating electrodes such that a short circuit does not occur between the electrodes. Provided is a rotating electrode unit comprising a rotor electrode unit in which one or more rotor electrodes and one or more rotor spacers are alternately stacked, and a stator electrode unit in which one or more stator electrodes and one or more stator spacers are alternately stacked, wherein the rotating electrode unit is configured such that when the rotor electrodes are power transmitting electrodes, the stator electrodes are power receiving electrodes, when the rotor electrodes are power receiving electrodes, the stator electrodes are power transmitting electrodes, the rotor elec-
(Continued)

trode unit and the stator electrode unit are combined in a nesting arrangement so as to be mutually rotatable, at least the outer peripheral section of the rotor electrodes is constituted by a member comprising a magnetic body, and the stator spacers have a magnet which attracts the outer peripheral section of the rotor electrodes via magnetic force.

4 Claims, 34 Drawing Sheets

(51) Int. Cl.
  *H02J 50/40* (2016.01)
  *H02K 16/02* (2006.01)
  *H01F 7/02* (2006.01)
  *H02K 1/2793* (2022.01)
  *H02K 15/03* (2006.01)
  *H02K 9/19* (2006.01)

(52) U.S. Cl.
  CPC .......... *H02K 16/025* (2013.01); *H02K 9/19* (2013.01); *H02K 15/03* (2013.01)

(58) Field of Classification Search
  CPC .. H02J 50/05; H02J 50/40; H01F 7/02; H01F 7/0247
  USPC .............................................. 310/309, 154.33
  See application file for complete search history.

(56) References Cited

U.S. PATENT DOCUMENTS

| | | | | |
|---|---|---|---|---|
| 2,970,238 A * | 1/1961 | Swiggett | H02K 3/26 | 310/268 |
| 3,090,880 A * | 5/1963 | Raymond | H02K 3/26 | 310/268 |
| 3,153,165 A * | 10/1964 | Henry-Baudot | H02K 24/00 | 310/268 |
| 3,189,808 A * | 6/1965 | Henry-Baudot | H02K 29/14 | 318/400.41 |
| 3,223,868 A * | 12/1965 | Henry-Baudot | H02K 3/26 | 310/185 |
| 3,223,870 A * | 12/1965 | Henry-Baudot | H02K 3/26 | 310/268 |
| 3,227,903 A * | 1/1966 | Henry-Baudot | H02K 3/26 | 310/268 |
| 3,450,919 A * | 6/1969 | Henry-Baudot | H02K 3/26 | 310/268 |
| 4,115,915 A * | 9/1978 | Godfrey | H02K 3/12 | 29/596 |
| 4,187,453 A * | 2/1980 | Rough | B41J 29/38 | 310/12.04 |
| 4,340,833 A * | 7/1982 | Sudo | H02K 3/26 | 310/207 |
| 4,645,961 A * | 2/1987 | Malsky | H02K 1/278 | 310/156.07 |
| 4,658,162 A * | 4/1987 | Koyama | H01F 5/003 | 310/184 |
| 4,677,332 A * | 6/1987 | Heyraud | H02K 3/26 | 310/184 |
| 4,794,293 A * | 12/1988 | Fujisaki | H02K 3/26 | 310/268 |
| 5,113,100 A * | 5/1992 | Taghezout | H02K 3/26 | 310/40 MM |
| 5,177,389 A * | 1/1993 | Schalk | G01P 3/48 | 310/171 |
| 5,942,830 A * | 8/1999 | Hill | H02K 3/26 | 310/179 |
| 6,411,002 B1* | 6/2002 | Smith | H02K 1/182 | 310/156.01 |
| 8,008,818 B2* | 8/2011 | Saito | H02K 5/00 | 310/81 |
| 8,823,241 B2* | 9/2014 | Jore | H02K 3/26 | 310/268 |
| 9,859,763 B2* | 1/2018 | Shaw | H02K 9/22 | |
| 2002/0163281 A1* | 11/2002 | Rafaelof | G11B 19/2009 | 310/309 |
| 2003/0080631 A1* | 5/2003 | Kageyama | G03F 7/70758 | 310/12.06 |
| 2004/0189144 A1* | 9/2004 | Gondoh | H02N 1/004 | 310/309 |
| 2005/0006980 A1* | 1/2005 | Horst | H02N 1/004 | 310/309 |
| 2005/0017598 A1* | 1/2005 | Zettl | H02N 1/002 | 310/309 |
| 2006/0055265 A1* | 3/2006 | Zalusky | H02K 21/24 | 310/156.32 |
| 2006/0087194 A1* | 4/2006 | Kataoka | H02K 21/24 | 310/207 |
| 2006/0202584 A1* | 9/2006 | Jore | H02K 3/26 | 310/179 |
| 2006/0214535 A1* | 9/2006 | Salmon | H02N 1/004 | 310/309 |
| 2007/0152536 A1* | 7/2007 | Chuang | F04D 25/0653 | 310/268 |
| 2008/0100174 A1* | 5/2008 | Stahlhut | H02K 1/20 | 310/268 |
| 2008/0238266 A1* | 10/2008 | Moriyama | H02K 1/30 | 310/67 R |
| 2010/0007223 A1* | 1/2010 | Denne | H02K 55/00 | 310/12.22 |
| 2010/0237728 A1* | 9/2010 | Saito | H02K 5/00 | 310/71 |
| 2011/0037354 A1* | 2/2011 | Yan | H02K 11/225 | 310/68 B |
| 2011/0057536 A1* | 3/2011 | Horng | H02K 3/26 | 310/208 |
| 2011/0109304 A1* | 5/2011 | Suzuki | H02K 29/12 | 324/207.25 |
| 2011/0227423 A1* | 9/2011 | Hsu | H02K 41/03 | 310/12.22 |
| 2011/0241463 A1* | 10/2011 | Iki | H02K 3/47 | 310/71 |
| 2011/0248601 A1* | 10/2011 | Pirk | G02B 26/0833 | 310/300 |
| 2011/0273048 A1* | 11/2011 | Jore | H02K 21/24 | 310/156.37 |
| 2012/0080971 A1* | 4/2012 | Tanimoto | H02K 23/26 | 310/154.45 |
| 2012/0080974 A1* | 4/2012 | Tanimoto | H02K 3/26 | 310/208 |
| 2012/0119606 A1* | 5/2012 | Chen | H02K 3/26 | 310/198 |
| 2012/0119608 A1* | 5/2012 | Chen | H02K 3/20 | 310/208 |
| 2012/0126927 A1* | 5/2012 | Iwaya | H01F 5/003 | 336/200 |
| 2012/0133231 A1* | 5/2012 | Hayakawa | H02K 21/24 | 310/156.37 |
| 2012/0133474 A1* | 5/2012 | Iwaya | H02K 3/26 | 336/200 |
| 2012/0139469 A1* | 6/2012 | Pelrine | H02K 41/031 | 318/696 |
| 2012/0181886 A1* | 7/2012 | Osada | H02K 3/14 | 310/71 |
| 2013/0106317 A1* | 5/2013 | Ludois | H02N 1/08 | 318/116 |
| 2013/0313935 A1* | 11/2013 | Himeno | H02K 15/03 | 310/156.32 |
| 2013/0340247 A1* | 12/2013 | Park | H05K 13/0411 | 29/739 |
| 2014/0175922 A1* | 6/2014 | Jore | H02K 1/12 | 310/71 |
| 2014/0252914 A1* | 9/2014 | Post | H02N 1/08 | 310/309 |
| 2014/0262499 A1* | 9/2014 | Smith | H01R 4/00 | 174/84 R |

(56) References Cited

U.S. PATENT DOCUMENTS

| | | | |
|---|---|---|---|
| 2014/0265722 A1* | 9/2014 | Post | H02N 1/00 310/309 |
| 2014/0368079 A1* | 12/2014 | Wong | H02K 21/24 310/208 |
| 2015/0076929 A1* | 3/2015 | Elenga | H02K 33/16 310/12.15 |
| 2015/0146322 A1* | 5/2015 | Bi | G11B 27/324 360/99.08 |
| 2015/0171720 A1* | 6/2015 | Jie | H02K 7/20 310/74 |
| 2015/0188375 A1* | 7/2015 | Sullivan | H02K 3/28 310/71 |
| 2016/0099663 A1* | 4/2016 | Petrowsky | H02N 1/004 310/300 |
| 2017/0207592 A1* | 7/2017 | Meinke | H01R 39/64 |
| 2019/0253000 A1* | 8/2019 | Kratchman | H01G 7/02 |
| 2021/0075344 A1* | 3/2021 | Ludois | H02N 1/002 |
| 2021/0175821 A1* | 6/2021 | Datskos | H02N 1/006 |

FOREIGN PATENT DOCUMENTS

| | | |
|---|---|---|
| JP | 2017-073901 A | 4/2017 |
| WO | 2016/143767 A1 | 9/2016 |

OTHER PUBLICATIONS

An Office Action mailed by the Indian Patent Office dated Feb. 10, 2021, which corresponds to Indian U.S. Appl. No. 16/642,350 and is related to U.S. Appl. No. 16/642,350.

\* cited by examiner

FIG. 1 – PRIOR ART
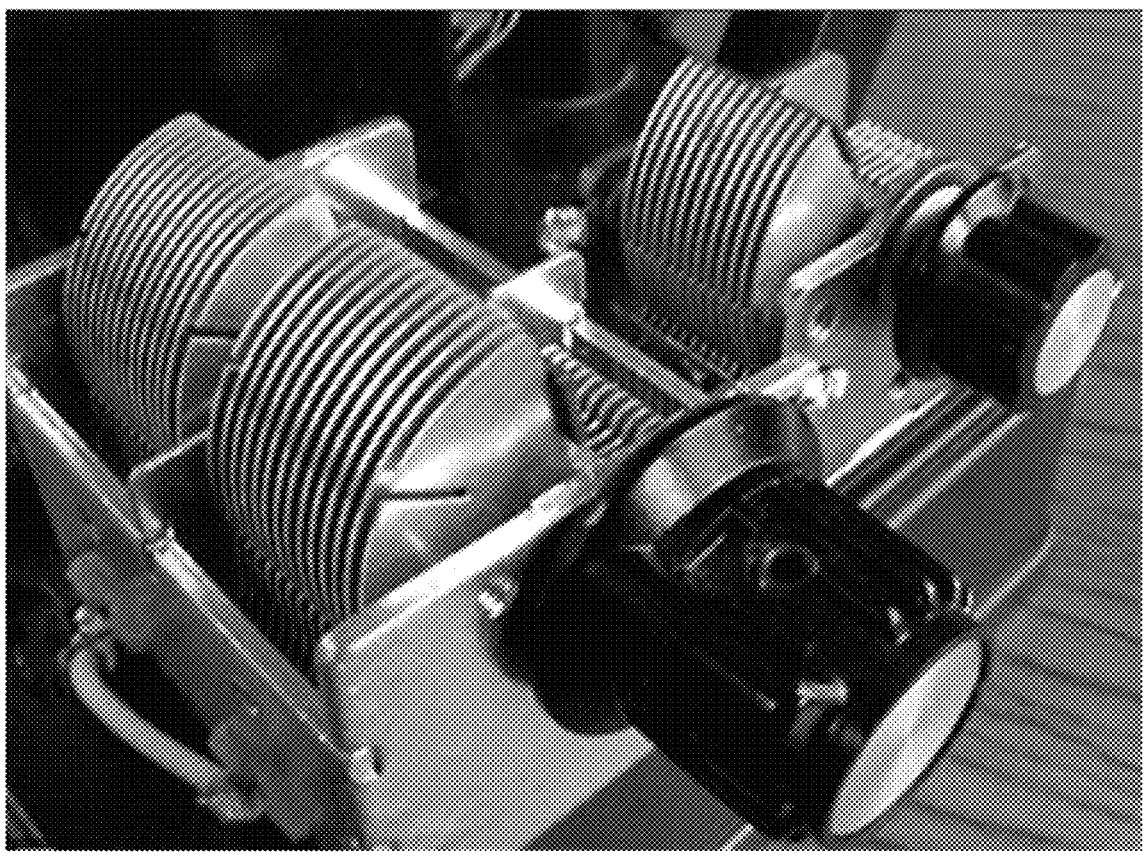

FIG. 2 – PRIOR ART
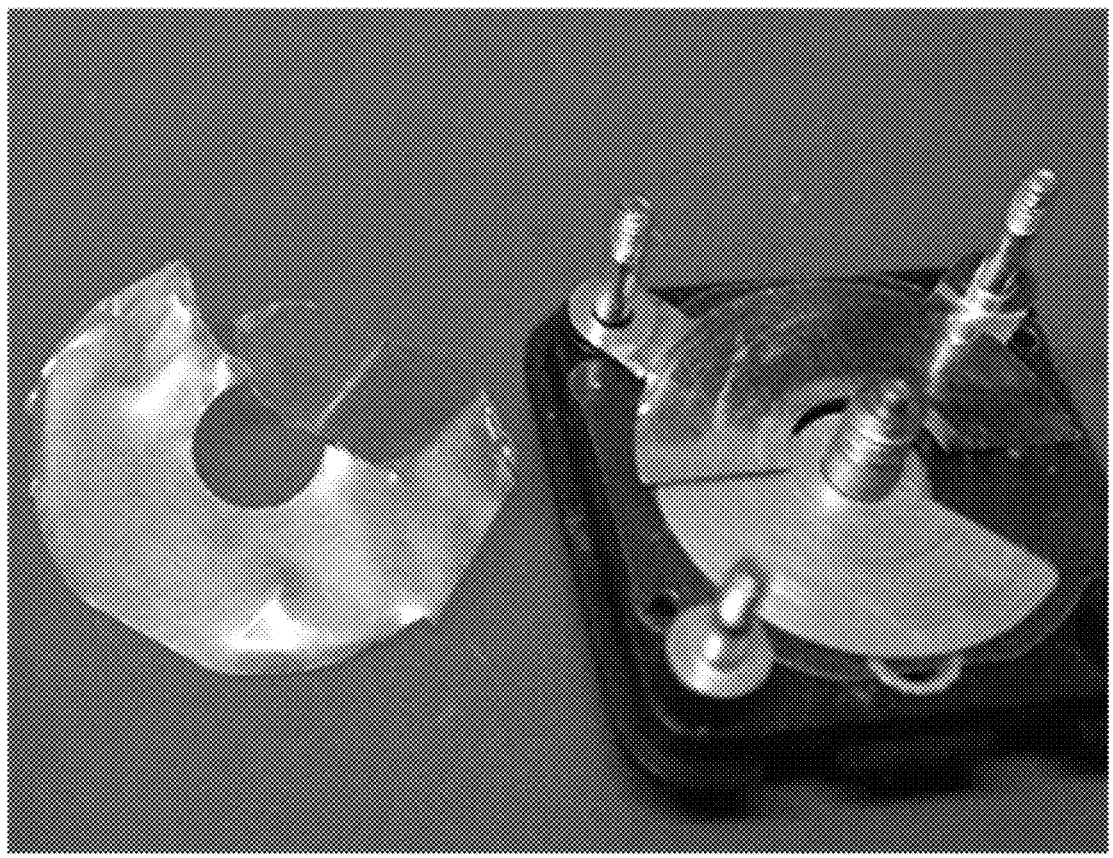

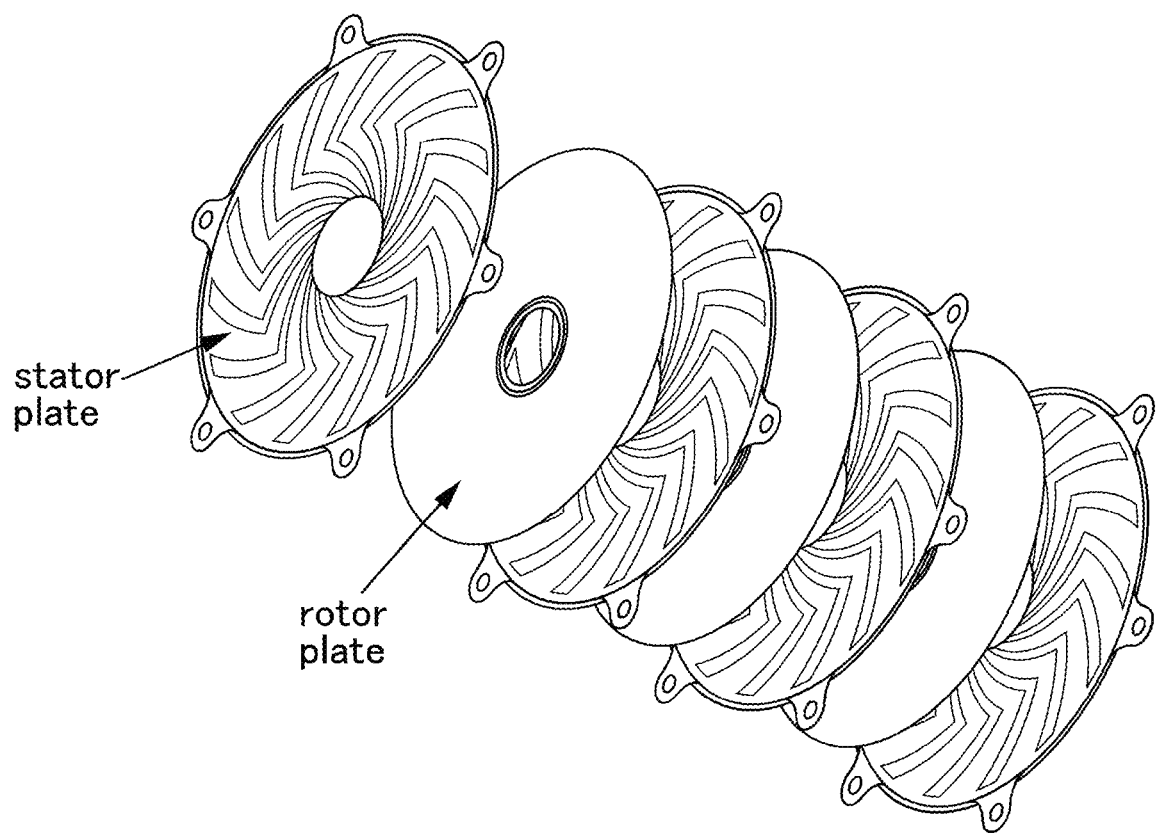
FIG. 3A – PRIOR ART

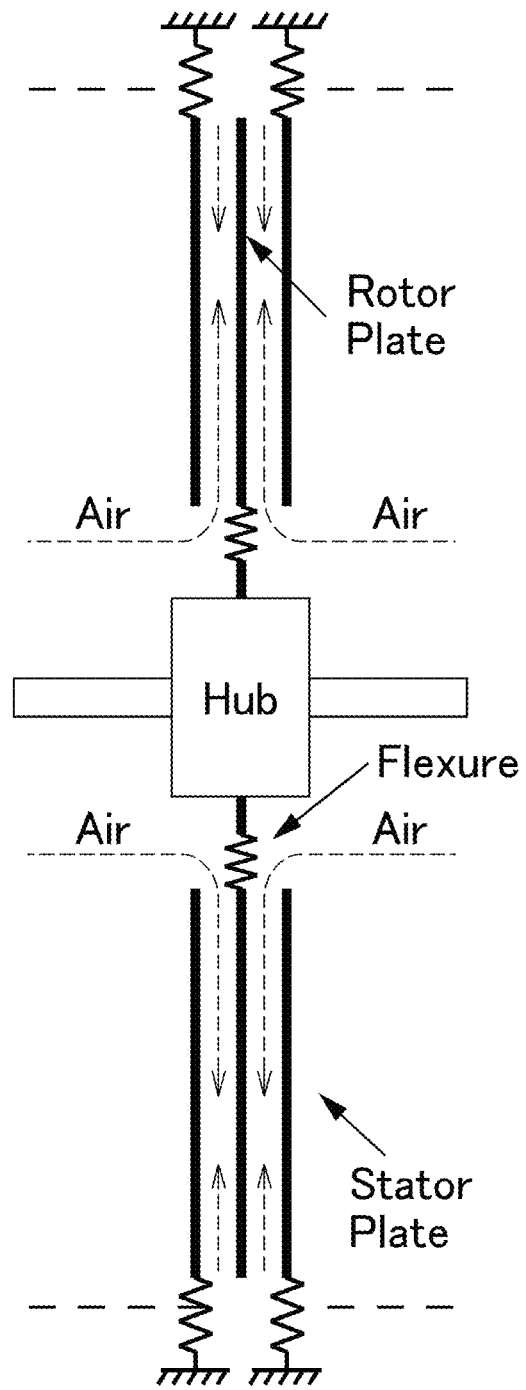
FIG. 3B – PRIOR ART

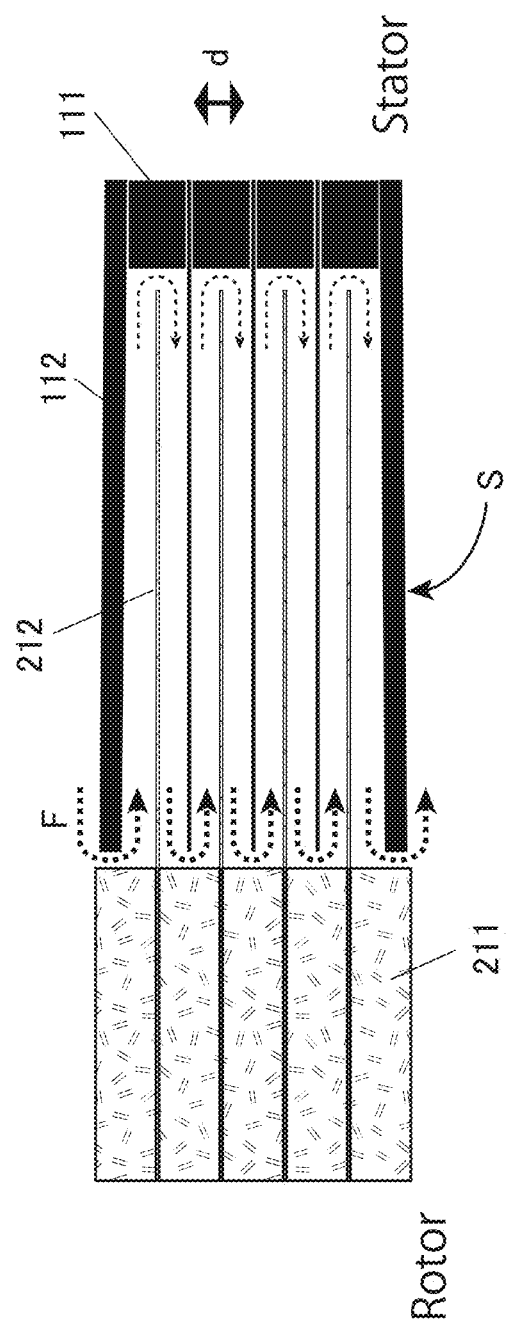

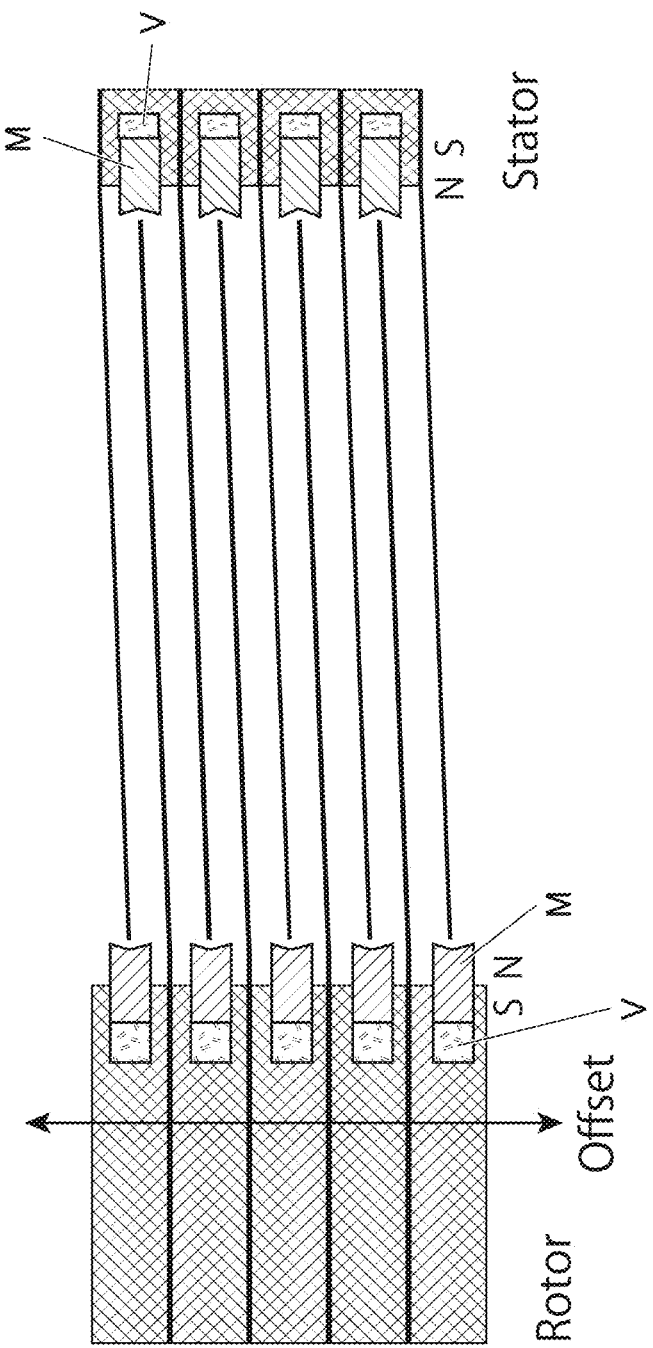

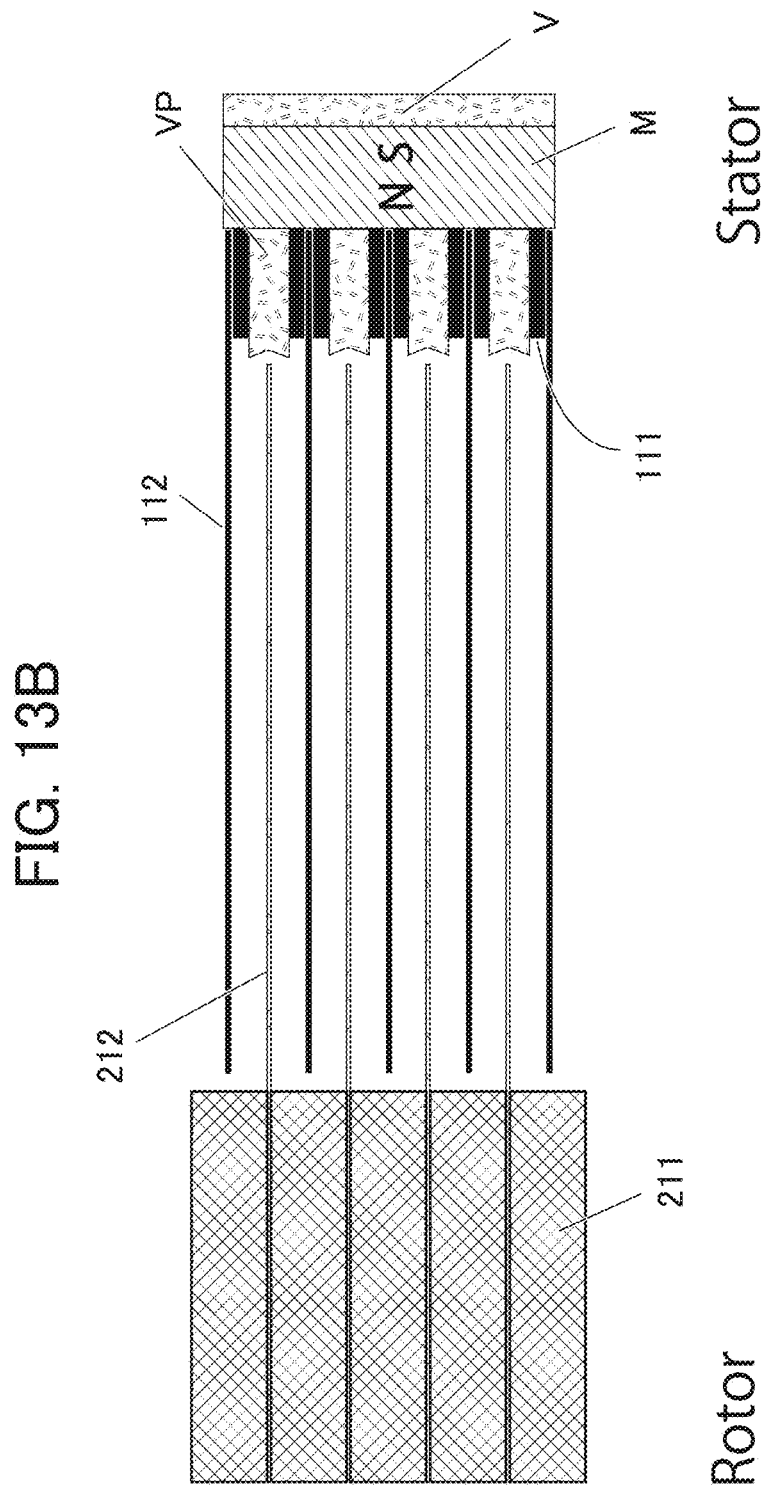

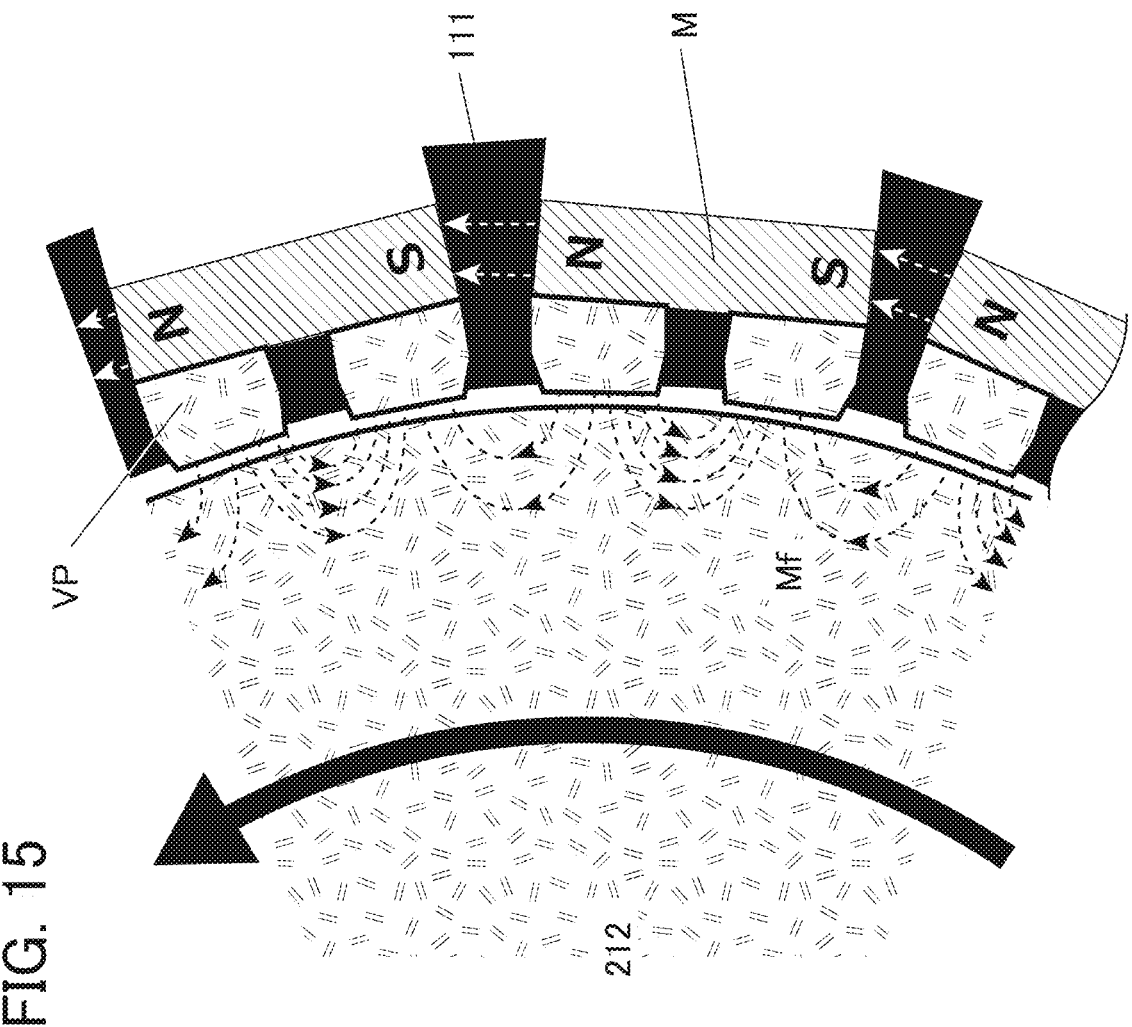
FIG. 15
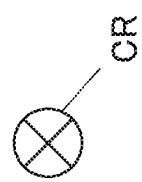
CR

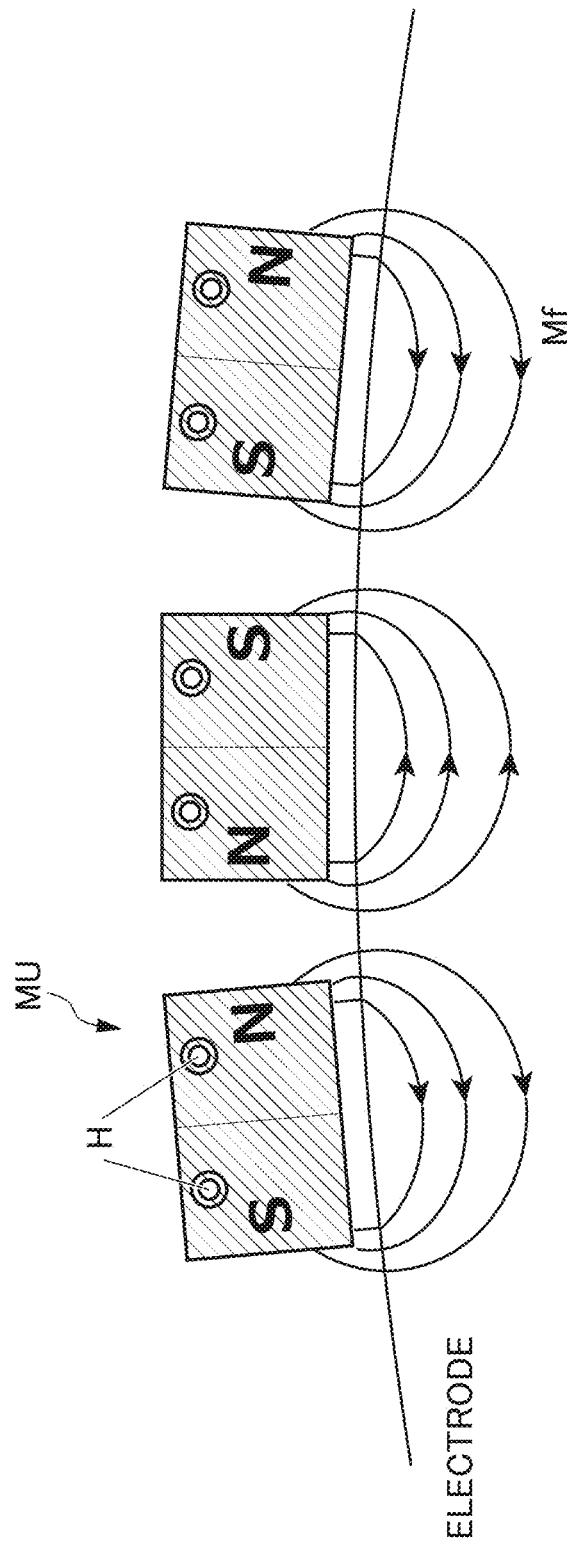

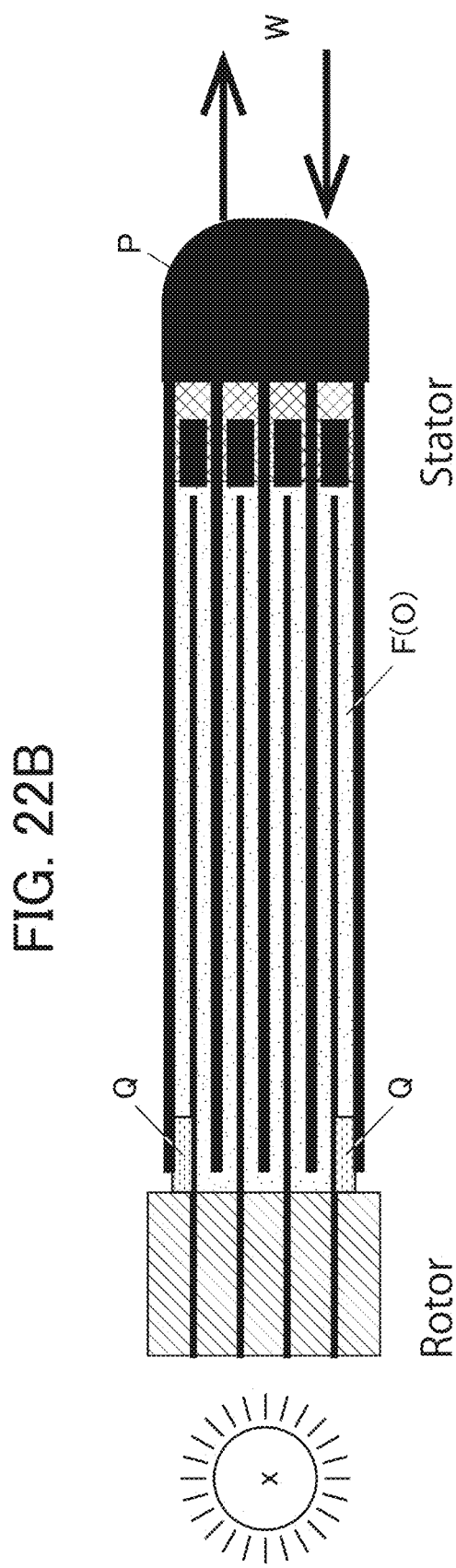

ELECTRIC POWER TRANSMISSION SYSTEM, AND MANUFACTURING METHOD FOR ELECTRIC POWER TRANSMISSION SYSTEM

TECHNICAL FIELD

The present invention relates to an electric power transmission system and a manufacturing method for an electric power transmission system.

BACKGROUND ART

Conventionally, a technique for increasing the junction capacitance when transmitting electric power by electric field coupling has been disclosed (see Patent Documents 1 and 2).

Patent Document 1: Japanese Unexamined Patent Application, Publication No. 2014-007200
Patent Document 2: Japanese Unexamined Patent Application, Publication No. 2015-099880

DISCLOSURE OF THE INVENTION

Problems to be Solved by the Invention

However, there is a need to transmit electric power to a rotating system as a mechanical element, and there is a demand for increasing the junction capacitance by using an electrode that rotates at high speed with respect to the conventional technique. A slip ring is currently used, and a method of transmitting electric power by contact is used. Since the contact type does not require an external circuit, this can be easily manufactured. However, since electric power is transmitted by using contact, a problem has occurred that the contacts wear out, an air layer is formed due to high-speed rotation to disable electric power transmission, or a water film is formed due to mixing of moisture to interrupt electric power transmission. In particular, there has been a problem that maintenance is required.

As a method for solving such a problem, there is an electric field coupling method that enables non-contact electric power transmission. In the field of the non-contact electric power transmission technique based on the electric field coupling method, fragmentary ideas have been conventionally proposed, but have not been put to practical use. The reason why the fragmentary ideas have not been put to practical use is that there are two major problems. One is a problem of having to perform a high-frequency operation, and the other is a problem of stably obtaining the junction capacitance of the rotating electrode such that a short circuit does not occur between electrodes. However, the problem of having to perform a high-frequency operation is solved by the development of semiconductors, such as gallium nitride (GaN) and silicon carbide (SiC). As a result, the remaining problem is a problem of stably obtaining the junction capacitance of the rotating electrode such that a short circuit does not occur between electrodes.

The present invention has been made in view of such a situation, and an object thereof is to provide a method of increasing the junction capacitance by stably obtaining the junction capacitance of a rotating electrode such that a short circuit does not occur between electrodes.

Means for Solving the Problems

In order to achieve the aforementioned object, an electric power transmission system according to an aspect of the present invention includes a rotating electrode unit including a rotor electrode unit in which one or more rotor electrodes and one or more rotor spacers are alternately stacked and a stator electrode unit in which one or more stator electrodes and one or more stator spacers are alternately stacked. In the rotating electrode unit, when the rotor electrode is a power transmitting electrode, the stator electrode is a power receiving electrode, when the rotor electrode is a power receiving electrode, the stator electrode is a power transmitting electrode, the rotor electrode unit and the stator electrode unit are combined in a nesting arrangement so as to be rotatable, at least an outer peripheral section of the rotor electrode is formed of a magnetic body, and the stator spacer has a magnet that attracts the outer peripheral section of the rotor electrode with a magnetic force.

In addition, the rotor spacer can have a magnet that attracts the outer peripheral section of the stator electrode with a magnetic force.

In addition, a fluid can be present in a gap formed between the rotor electrode and the stator electrode, and the fluid can be sealed.

In addition, a manufacturing method for an electric power transmission system according to an aspect of the present invention is a manufacturing method for an electric power transmission system to which an electric field coupling power transmission technique is applied, which includes a rotating electrode unit including a rotor electrode unit in which one or more rotor electrodes and one or more rotor spacers are alternately stacked and a stator electrode unit in which one or more stator electrodes and one or more stator spacers are alternately stacked, and in which, in the rotating electrode unit, when the rotor electrode is a power transmitting electrode, the stator electrode is a power receiving electrode, when the rotor electrode is a power receiving electrode, the stator electrode is a power transmitting electrode, the rotor electrode unit and the stator electrode unit are combined in a nesting arrangement so as to be rotatable, and at least an outer peripheral section of the rotor electrode is formed of a magnetic body, the manufacturing method for an electric power transmission system including: a step of disposing a magnet on the stator spacer to attract the outer peripheral section of the rotor electrode with a magnetic force; a step of sealing a fluid in a gap formed between the rotor electrode and the stator electrode; and a step of removing the magnet disposed on the stator spacer.

Effects of the Invention

According to the present invention, the junction capacitance can be increased by stably obtaining the junction capacitance of the rotating electrode such that a short circuit does not occur between electrodes.

BRIEF DESCRIPTION OF THE DRAWINGS

FIG. 1 is a diagram showing the external appearance of an air-varicon as a conventional rotary capacitor.

FIG. 2 is a diagram showing the external appearance of a polyvaricon as a conventional rotary capacitor.

FIG. 3A is a diagram illustrating a method of transmitting electric power to a rotating body that has been used in the related art.

FIG. 3B is a diagram illustrating a method of transmitting electric power to a rotating body that has been used in the related art.

FIG. 10B is an enlarged cross-sectional view illustrating a problem of a rotating electrode unit manufactured by the method illustrated in FIGS. 6A to 8B.

FIG. 12B is a diagram illustrating a case where a situation occurs in which the entire rotor side is offset.

FIG. 13B is an enlarged view of the right half of the overall cross-sectional view illustrated in FIG. 13A.

FIG. 15 is an enlarged plan view illustrating a case where a thin ferromagnetic body piece corresponding to a multi-layer electrode is inserted into a stator spacer and a magnet is attached last.

FIG. 18C is an image diagram illustrating an attraction magnet unit and an arrangement method thereof.

FIG. 22B is an enlarged cross-sectional view illustrating an example of a rotating electrode unit having a heat exchange function of a heat exchanger.

PREFERRED MODE FOR CARRYING OUT THE INVENTION

Hereinafter, embodiments of the present invention will be described with reference to the diagrams.

FIG. 1 is a diagram showing the external appearance of an air-varicon as a conventional rotary capacitor. FIG. 2 is a diagram showing the external appearance of a polyvaricon as a conventional rotary capacitor. FIGS. 3A and 3B are diagrams illustrating a method of transmitting electric power to a rotating body that has been used in the related art.

(Basic Structure)

These conventional rotary capacitors illustrated in FIGS. 1 and 2 are used to vary the resonance frequency of a resonance circuit, such as a radio. For this reason, the purpose is to change the capacitance by manual rotation. The approximate capacitances are both several hundred pF. That is, these conventional rotary capacitors are used for tuning signals and the like, and do not transmit electric power. For example, in the air-varicon shown in FIG. 1, the gap between a stator side electrode and a rotor side electrode is maintained with mechanical precision. Therefore, there is a limit to reducing the gap to increase the capacitance. In addition, in the polyvaricon shown in FIG. 2, a film is interposed between electrodes to maintain the electrode gap. For this reason, small size manufacturing is possible. However, this is not suitable for high-speed rotation applications. This is because the performance cannot be maintained due to deterioration of friction between the film and the electrode. In addition, as a method of transmitting electric power to a rotating body, there is a method invented in the 1900s in which a stator side disk electrode and a rotor side disk electrode are disposed in multiple layers to form a rotatable junction capacitance. However, in order to put this method into practical use, there is a problem that a practical capacitance should be realized in a completely non-contact state. As a method for solving this problem, there is a method proposed by the University of Wisconsin illustrated in FIGS. 3A and 3B. In the method illustrated in FIGS. 3A and 3B, however, since a method of forming a gap by flowing air between electrode plates is adopted, a pump should be provided outside, and energy for operation should be secured. For this reason, the cost required for practical use increases.

Figure 4:
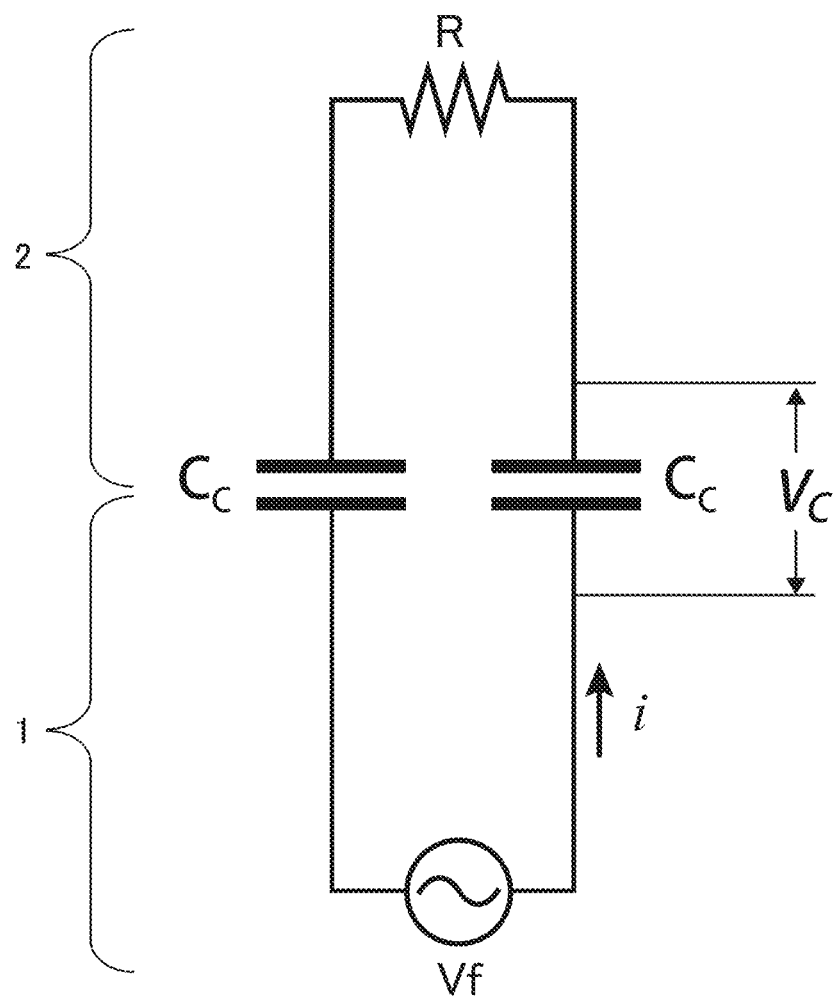
FIG. 4 is a basic circuit diagram of non-contact electric power supply using an electric field coupling method.

FIG. 4 is a basic circuit diagram of non-contact electric power supply using an electric field coupling method.

As illustrated in FIG. 4, electric power output from a high-frequency electric power source Vf on a side of an electric power transmission unit 1 is transmitted to a load R on a side of an electric power reception unit 2 through two junction capacitances Cc. Here, since the junction capacitance Cc is a pair of metal plates, it is possible to supply electric power to a linear system or a rotating system by sliding or rotating one electrode with respect to the other electrode. In addition, since the present invention is to supply electric power to the rotating system, the junction capacitance Cc that can be rotated will be described.

Figure 5:
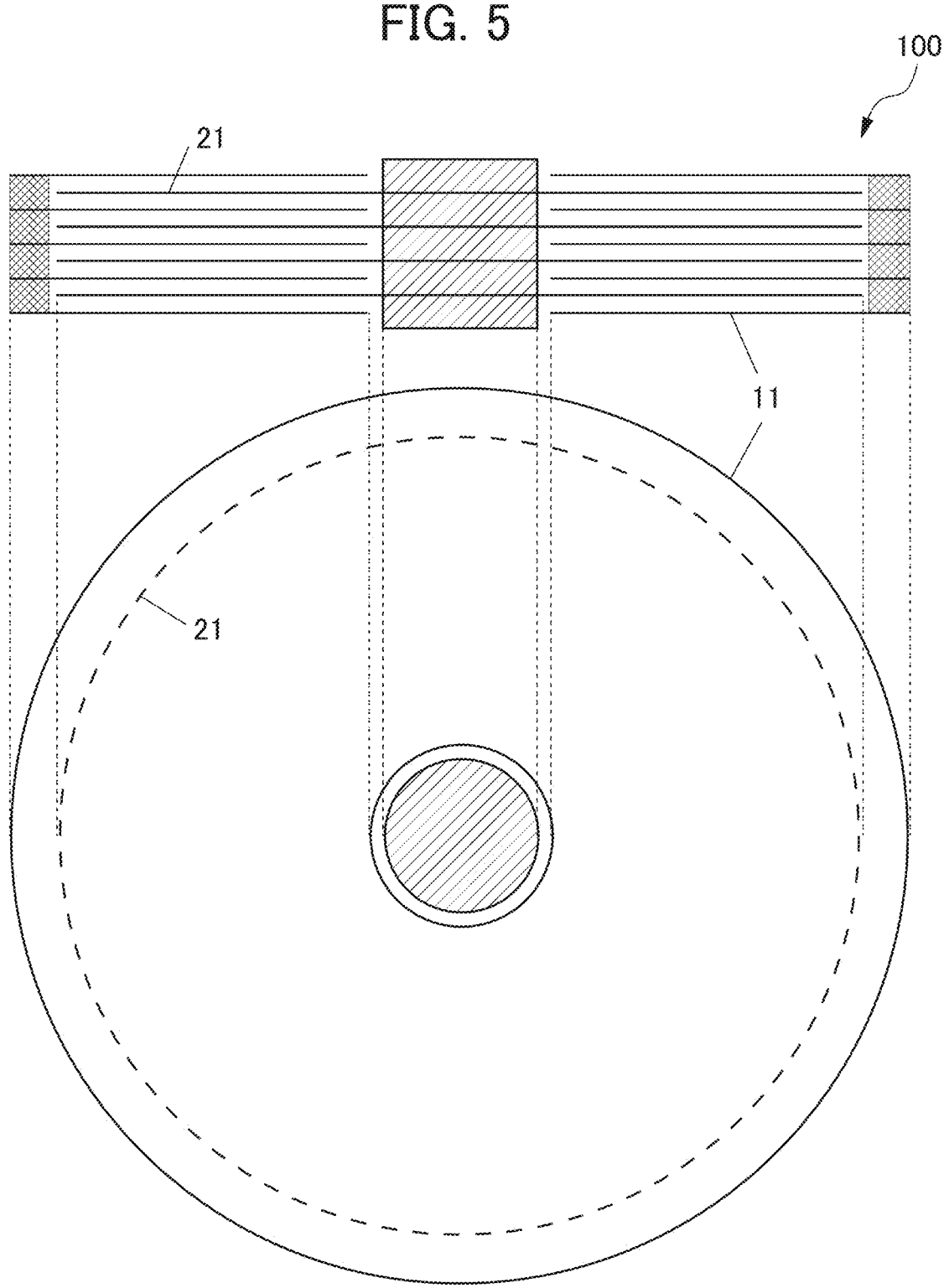
FIG. 5 is a plan view and a side sectional view illustrating the structure of a rotating electrode unit including a stator electrode unit and a rotor electrode unit.

FIG. 5 is a plan view and a side sectional view illustrating the structure of a rotating electrode unit 100 including a stator electrode unit 11 and a rotor electrode unit 21.

As illustrated in FIG. 5, the rotating electrode unit 100 is an electrode unit having a multilayer structure including a plurality of stator electrode units 11 and a plurality of rotor electrode units 21 wherein one side of one junction capacitance Cc is the stator electrode unit 11 and the other side is the rotor electrode unit 21. With a multilayer structure, the large junction capacitance Cc can be secured. Specifically, four rotor electrode units 21 are interposed between the five-layer donut-shaped stator electrode units 11, and the stator electrode unit 11 is fixed and the rotor electrode unit 21 rotates. In addition, in FIG. 5, a bearing, a cover, and the like are not illustrated for simplicity of description, and only electrodes are illustrated.

Figure 6A:
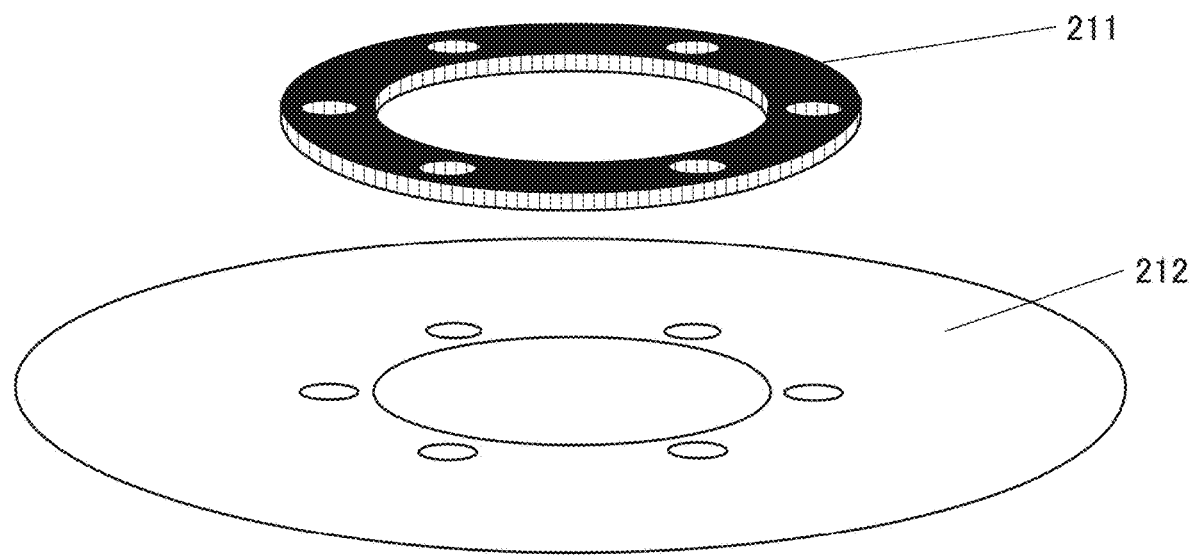
FIG. 6A is a diagram illustrating a state before a rotor spacer and a rotor electrode configuring a rotor electrode unit are combined.
Figure 6B:
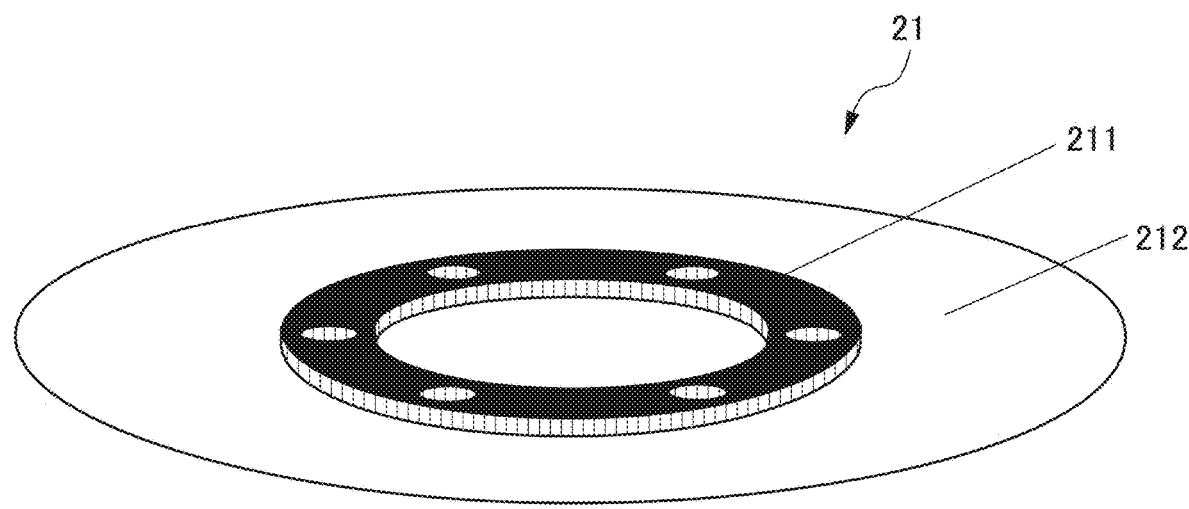
FIG. 6B is a diagram illustrating a state after a rotor spacer and a rotor electrode are combined.

FIGS. 6A and 6B are perspective views illustrating the basic structure of a rotating electrode unit.

FIG. 6A is a diagram illustrating a state before a rotor spacer 211 and a rotor electrode 212 configuring the rotor electrode unit 21 are combined. FIG. 6B is a diagram illustrating a state after the rotor spacer 211 and the rotor electrode 212 are combined. That is, as illustrated in FIGS. 3A and 3B, the rotor electrode unit 21 is obtained by concentrically fixing a metal ring serving as the rotor spacer 211 to a ring-shaped ultra-thin metal plate serving as the rotor electrode 212.

Figure 7A:
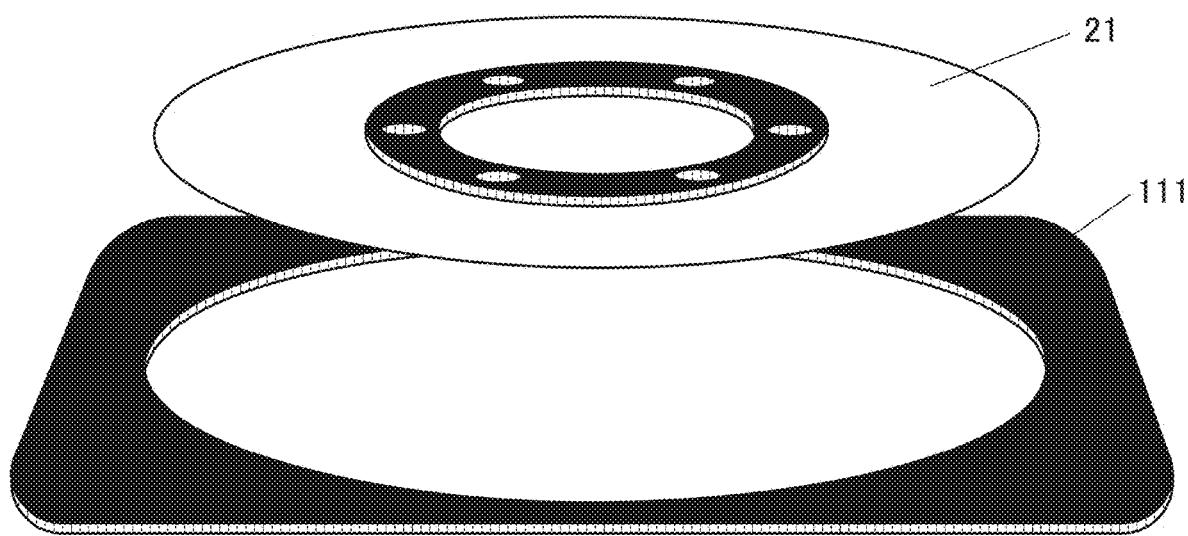
FIG. 7A is a diagram illustrating a state before a rotor electrode unit and a stator spacer are combined.
Figure 7B:
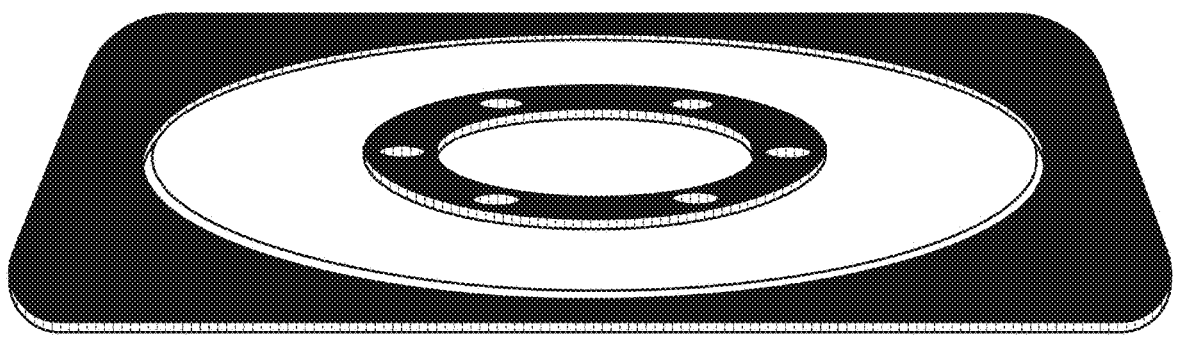
FIG. 7B is a diagram illustrating a state after a rotor electrode unit and a stator spacer are combined.

FIGS. 7A and 7B are perspective views illustrating a state in which a stator spacer 111 is disposed around the rotor electrode unit 21.

FIG. 7A is a diagram illustrating a state before the rotor electrode unit 21 and the stator spacer 111 are combined. FIG. 7B is a diagram illustrating a state after the rotor electrode unit 21 and the stator spacer 111 are combined. That is, as illustrated in FIGS. 7A and 7B, the stator spacer 111 is disposed around the rotor electrode unit 21.

Figure 8A:
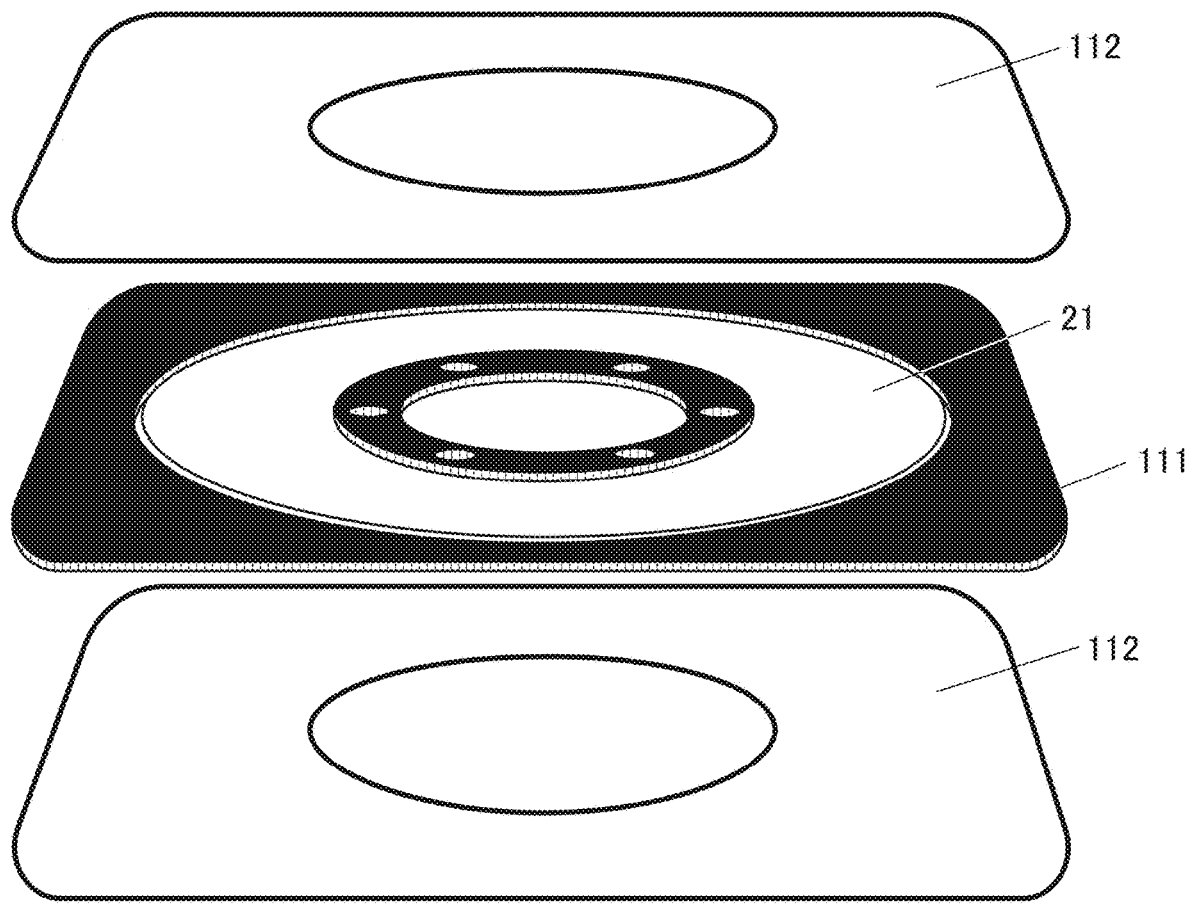
FIG. 8A is a diagram illustrating a state before stator electrodes are attached and combined above and below a combination of a rotor electrode unit and a stator spacer.
Figure 8B:
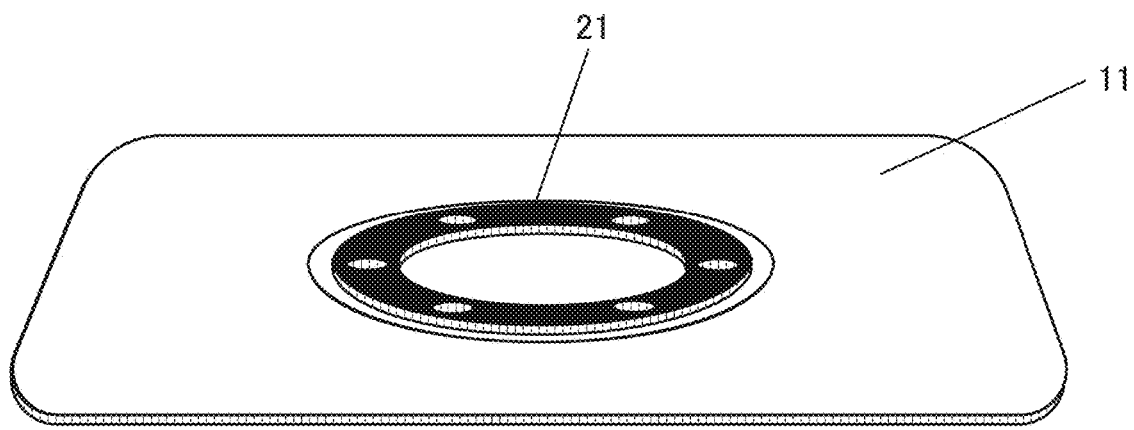
FIG. 8B is a diagram illustrating a state after stator electrodes are attached and combined above and below a combination of a rotor electrode unit and a stator spacer.

FIGS. 8A and 8B are perspective views illustrating a case where the rotating electrode unit 100 is obtained by attaching and combining stator electrodes 112 above and below the combination of the rotor electrode unit 21 and the stator spacer 111.

FIG. 8A is a diagram illustrating a state before the stator electrodes 112 are attached and combined above and below the combination of the rotor electrode unit 21 and the stator spacer 111. FIG. 8B is a diagram illustrating a state after the stator electrodes 112 are attached and combined above and below the combination of the rotor electrode unit 21 and the stator spacer 111. That is, as illustrated in FIG. 8B, the rotating electrode unit 100 is obtained by attaching and combining the stator electrodes 112 above and below the combination of the rotor electrode unit 21 and the stator spacer 111. In addition, in the examples illustrated in FIGS. 6A to 8B, for the sake of explanation, the respective units are manufactured. However, in the manufacturing process, these components are stacked, pressed vertically, and then integrated by welding the ends by laser welding or the like. In addition, in the example illustrated in FIGS. 8A and 8B, one rotor electrode unit 21 is interposed between two stator electrodes from above and below, and the rotating electrode unit 100 is obtained by stacking these in multiple layers. The light and thin rotating electrode unit 100 can be manufactured by the method described above.

The electric power transmission system according to the present embodiment is a fundamental improvement of the above-described conventional rotary capacitor, and the junction capacitance Cc is formed by a rotary electrode that can rotate at high speed for any number of rotations. In addition, it is possible to enlarge the junction capacitance Cc as a rotating electrode for electric power transmission. If the junction capacitance Cc can be enlarged, it is possible to set the inverter frequency or the transmission voltage to a low value when transmitting predetermined electric power. Conversely, when the purpose is to transmit a large amount of electric power, an inverter of an existing frequency can be used without requiring an inverter of an extremely high frequency or the like, so that the cost can be reduced. In addition, the electric power transmission voltage can be set to be low. Hereinafter, details of the electric power transmission system of the present embodiment will be described.

Figure 9:
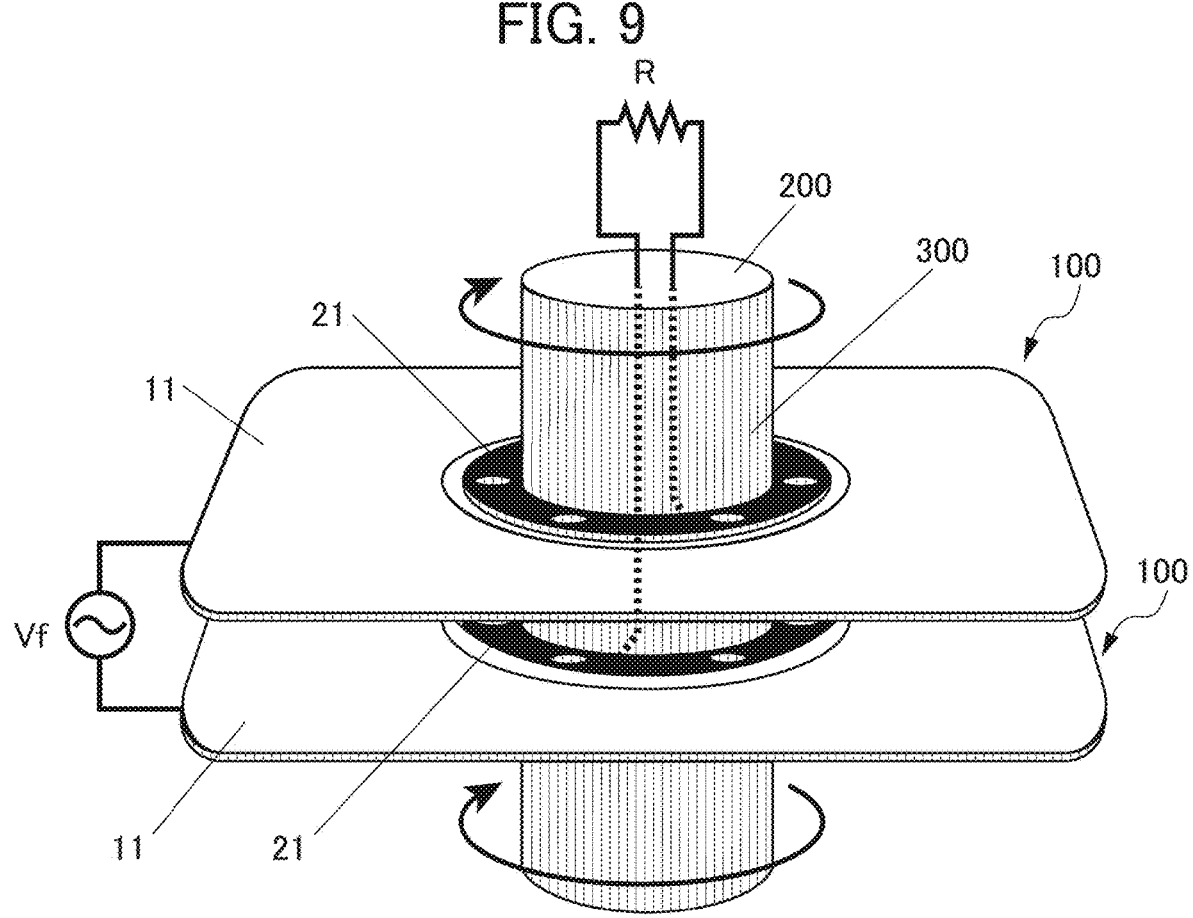
FIG. 9 is a perspective view illustrating a case where two rotating electrode units are connected to transmit electric power to a shaft as a rotating body.

FIG. 9 is a perspective view illustrating a case where the two rotating electrode units 100 are connected to transmit electric power to a shaft 200 as a rotating body.

In order to generate the circuit illustrated in FIG. 4 using the rotating electrode unit 100, it is necessary to prepare two sets of rotating electrode units 100 as illustrated in FIG. 9. The two rotating electrode units 100 are disposed in parallel and concentrically, and the rotating electrode unit 100 is coupled to the shaft 200 as a rotating body using an insulating material 300. The wiring is connected from each rotating electrode unit 100 to the load R on the shaft 200. On the other hand, a high-frequency voltage from the high-frequency electric power source Vf is applied between the two stator electrode units 11. Therefore, electric power can be transmitted from the stator electrode unit 11 side to the rotor electrode unit 21 side. On the other hand, in order to transmit electric power obtained on the rotor electrode unit 21 side to the stator electrode unit 11 side, the positional relationship between the high-frequency electric power source Vf and the load R may be reversed.

(Problems of Rotating Electrode)

Figure 10A:
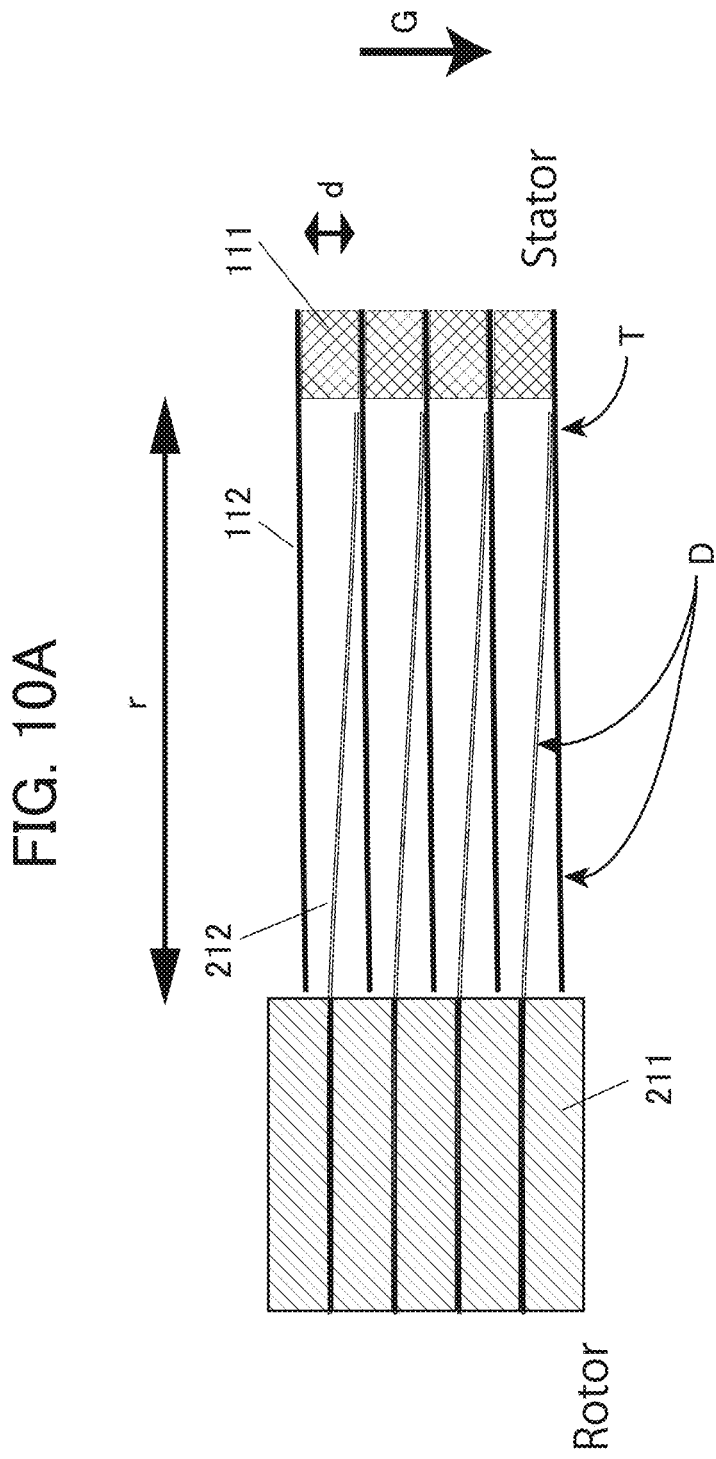
FIG. 10A is an enlarged cross-sectional view illustrating a problem of a rotating electrode unit manufactured by the method illustrated in FIGS. 6A to 8B.

Next, a problem in the rotating electrode unit 100 manufactured by the above method will be described with reference to FIGS. 10A and 10B. FIGS. 10A and 10B are enlarged cross-sectional views illustrating a problem of the rotating electrode unit 100 manufactured by the method illustrated in FIGS. 6A to 8B.

In order to enlarge the junction capacitance Cc of the rotating electrode unit 100, there is a method of increasing the radius of each of the stator electrode 112 and the rotor electrode 212 forming an electrode pair or a method of bringing the stator electrode 122 and the rotor electrode 212 close to each other so that the distance between the stator electrode 122 and the rotor electrode 212 (hereinafter, referred to as an "electrode gap") is reduced. Specifically, as illustrated in FIG. 10A, a method of increasing the length r of a portion where the stator electrode 112 and the rotor electrode 212 face each other or reducing a distance d between the stator electrodes 112 can be considered. For example, assuming that the distance d between the stator electrodes 112 is 0.5 mm, the radius of the stator electrode 112 is 150 mm, and the radius of the rotor spacer 211 is 50 mm, the length r of the portion where the stator electrode 112 and the rotor electrode 212 face each other is about 100 mm. In this case, assuming that the thickness of the rotor electrode 212 is 0.1 mm, the electrode gaps above and below the rotor electrode 212 is 0.2 mm.

However, in order to manufacture such a device, mechanically high precision is required, so that a high cost is required. In particular, when the length r of the portion where the stator electrode 112 and the rotor electrode 212 face each other is increased, it is necessary to dispose the rotor electrode 212 near the center of the narrow distance between electrodes. Therefore, technically very high precision is required. For this reason, the manufacturing cost increases, and the maintenance is not easy. In addition, taking aging at the time of use, bending of a metal plate due to temperature, and the like into consideration, it is difficult to maintain the non-contact state. In addition, even in a case where the length r of the portion where the stator electrode 112 and the rotor electrode 212 face each other is increased, if the distance d between the stator electrodes 112 facing each other increases, the enlargement of the junction capacitance Cc cannot be expected eventually.

In addition, as illustrated in FIG. 10A, since the rotor electrode 212 is held only at the center section, sag D occurs at the outer peripheral section due to the influence of gravity G. On the other hand, since the periphery of the stator electrode 112 is fixed, the degree of the sag D is smaller than that of the rotor electrode 212, but the sag D occurs slightly at the outer peripheral section due to the influence of gravity G.

To cope with this problem, the degree of sag can be reduced by increasing the thickness of these electrodes (the rotor electrode 212 and the stator electrode 112). For example, the electrodes can be manufactured using a rigid thick plate. However, the weight increases, and the cost increases. In addition, if sand particles are mixed, the electrodes may be damaged. In addition, as illustrated in FIG. 10A, if there is a portion T where the electrodes (that is, the rotor electrode 212 and the stator electrode 112) are in contact with each other, a short circuit occurs. In addition, even if the electrodes are coated with an insulating layer in order to prevent a short circuit, the coating eventually peels off if the electrodes are continuously rotated for a long time. For this reason, the electrodes come into contact with each other to cause a short circuit. If a short circuit occurs, a large current flows to a specific portion, and the electrodes are damaged. In addition, immediately before the short circuit, the electrodes may be melted by discharging. As a result, the function as a capacitor cannot be performed.

As a method for solving such a problem, as illustrated in FIG. 10B, a method of flowing a fluid F between electrodes can be considered. The fluid F includes a liquid, such as water or oil, and a gas, such as air or gas. However, when this method is used, the following problems (1) to (4) occur. That is, (1) since a pump is required to flow the fluid F, the volume and the cost are increased.

(2) Since it is necessary to form a return path for circulating the fluid, the volume of the system increases.

(3) Since the resistance for flowing the fluid increases as the number of stacked electrode plates increases, it is necessary to prepare a pump at the outside. However, if the pump pressure increases, the pressure causes swelling S of the stator electrode 112. In order to prevent the swelling S, it is necessary to increase the strength by increasing the thickness of the outermost stator electrode 112. That is, the device becomes large.

(4) When the fluid has viscosity, the rotation torque of the rotor increases.

(Specific Method for Solving the Problem)

Figure 11A:
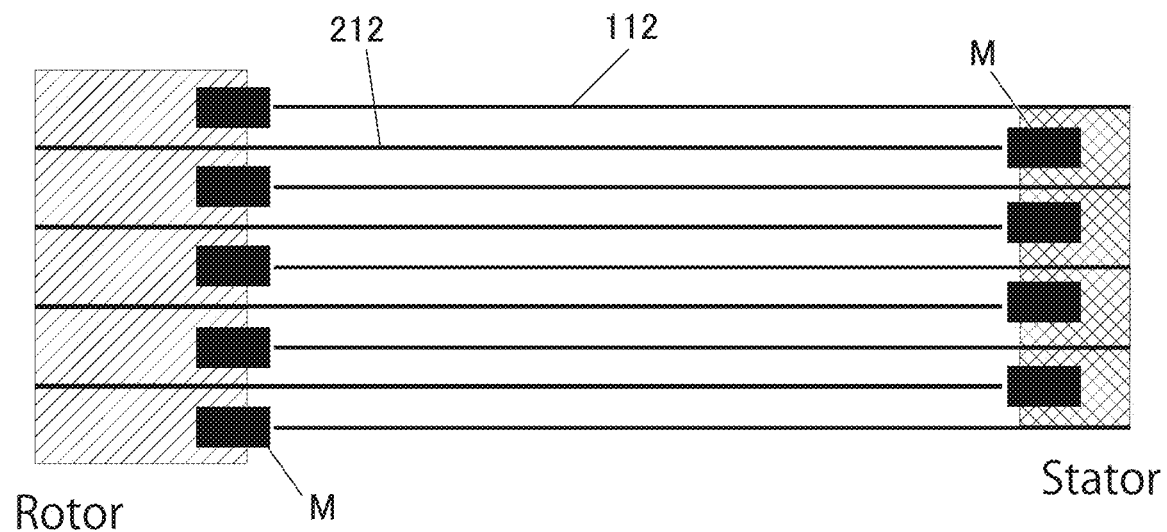
FIG. 11A is a diagram illustrating a bidirectional attraction method in which an end of a rotor electrode is attracted by using the magnetic force of a magnet disposed on a stator spacer and an end of a stator electrode is attracted by using the magnetic force of a magnet disposed on a rotor spacer.
Figure 11B:
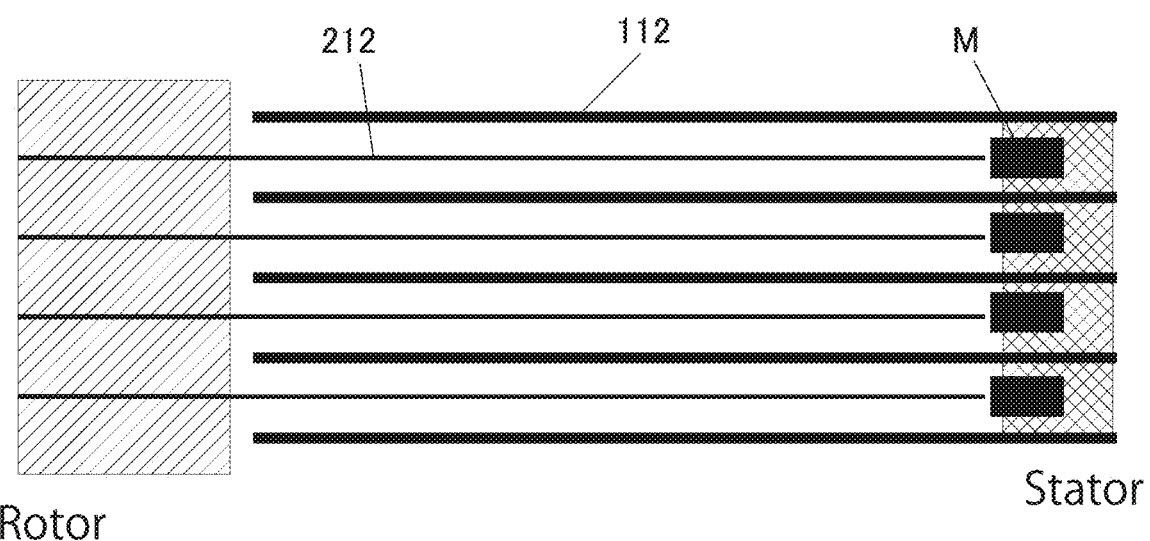
FIG. 11B is a diagram illustrating a one-way attraction method in which only an end of a rotor electrode is attracted by using the magnetic force of a magnet disposed on a stator spacer.

Next, a method for solving the above problem will be described with reference to FIGS. 11A and 11B. FIGS. 11A and 11B are enlarged cross-sectional views illustrating a state in which a magnet M is disposed in front of the end of each of the stator electrode 112 and the rotor electrode 212.

FIG. 11A is a diagram illustrating a bidirectional attraction method in which the end of the rotor electrode 212 is attracted by using the magnetic force of the magnet M disposed on the stator spacer 111 and the end of the stator electrode 112 is attracted by using the magnetic force of the magnet M disposed on the rotor spacer 211. FIG. 11B is a diagram illustrating a one-way attraction method in which only the end of the rotor electrode 212 is attracted by using the magnetic force of the magnet M disposed on the stator spacer 111. As illustrated in FIGS. 11A and 11B, the problem of the sag D of the electrode due to the influence of gravity G can be solved by pulling the end of the electrode with the magnet M. In addition, the entire electrode may be formed of a ferromagnetic body, or only the outer peripheral section of the electrode may be formed of a ferromagnetic body and the other section may be formed of a non-magnetic body. In addition, the magnet M may be a permanent magnet or an electric magnet. A permanent magnet and an electric magnet may be combined. In addition, what is adopted as a ferromagnetic body is not particularly limited, and iron, cobalt, nickel, and the like can be adopted.

Figure 12A:
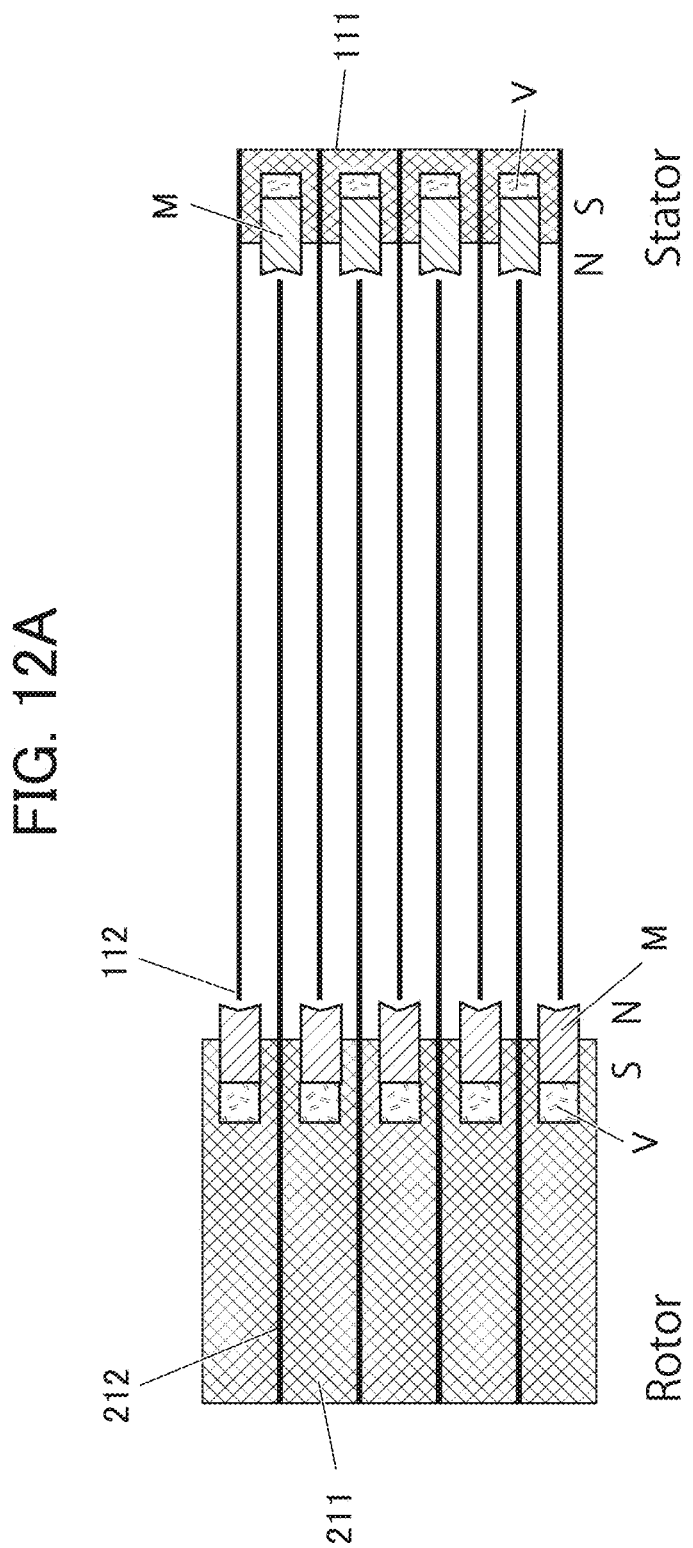
FIG. 12A is a diagram illustrating a case where a rotor electrode and a stator electrode are formed of an ultra-thin ferromagnetic body, a rotor spacer and a stator spacer are also formed of a ferromagnetic body, and a magnet is disposed in consideration of the polarity so that a magnetic path is formed between the stator side and the rotor side.

FIGS. 12A and 12B are enlarged cross-sectional views illustrating other examples in a case where the magnet M is disposed around the stator electrode and around the rotor electrode 212.

FIG. 12A is a diagram illustrating a case where the rotor electrode 212 and the stator electrode 112 are formed of an ultra-thin ferromagnetic body, the rotor spacer 211 and the stator spacer 111 are also formed of a ferromagnetic body, and the magnet M is disposed in consideration of the polarity so that a magnetic path is formed between the stator side and the rotor side. In the magnet M disposed on the rotor spacer 211 side, a ferromagnetic body V is disposed on a surface opposite to a surface facing the stator electrode 112. Similarly, in the magnet M disposed on the stator spacer 111 side, the ferromagnetic body V is disposed on a surface opposite to a surface facing the rotor electrode 212. Thus, disposing the ferromagnetic body V on the surface opposite to the surface of the magnet M that pulls the electrode is effective in forming a magnetic circuit. This is the same as in the example illustrated in FIG. 12B described later.

FIG. 12B is a diagram illustrating a case where a situation occurs in which the entire rotor side is offset. In such a case, since the stator electrode 112 is also formed of an ultra-thin metal, electrodes can be prevented from being in contact with each other. However, since the stator electrode 112 has a configuration that is not easily deformed, a cut or a fold (not illustrated) may be formed in advance on the stator electrode 112 so as to allow a larger elastic deformation when the range of elastic deformation is exceeded. In the case of the examples illustrated in FIGS. 12A and 12B, the rotor electrode 212 and the stator electrode 112 need to be ferromagnetic bodies. However, when an ultra-thin metal is used for the electrodes, the magnetic path cannot be considered because the magnetic resistance increases. Therefore, it is not necessary to match the polarity of the magnet M between the stator side and the rotor side. In addition, it is not necessary to consider the polarity in the stator and in the rotor.

Figure 13A:
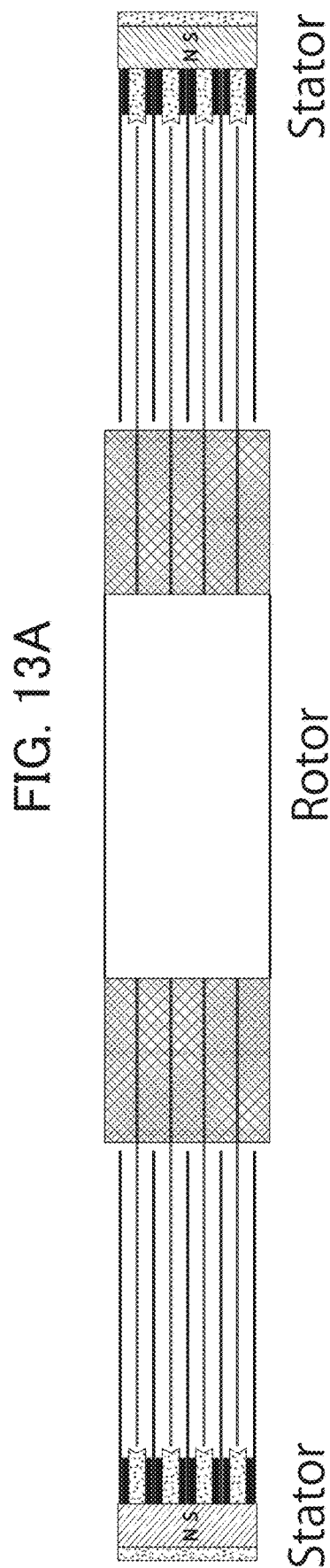
FIG. 13A is an overall cross-sectional view illustrating a case where a ferromagnetic body piece VP having a unique shape is disposed around a rotor electrode formed of a ferromagnetic body.

Next, a method of disposing the magnet M in a configuration different from the configuration adopted in the examples illustrated in FIGS. 11A and 11B and FIGS. 12A and 12B will be described with reference to FIGS. 13A and 13B. FIGS. 13A and 13B are cross-sectional views illustrating methods of disposing the magnet M in a configuration different from the configuration adopted in the examples illustrated in FIGS. 11A and 11B and FIGS. 12A and 12B.

FIG. 13A is an overall cross-sectional view illustrating a case where a ferromagnetic body piece VP having a unique shape is disposed around the rotor electrode 212 formed of a ferromagnetic body. FIG. 13B is an enlarged view of the right half of the overall cross-sectional view illustrated in FIG. 13A. As illustrated in FIGS. 12A and 12B, the magnet M itself disposed around each of the stator electrode 112 and the rotor electrode 212 formed of a ferromagnetic body can be processed into a unique shape (a shape having a recess at the center of the surface facing the rotor electrode 212) and be magnetized. However, in this case, the cost is increased, and a repulsive force is generated between the adjacent magnets M, which makes it difficult to dispose the magnet M. For this reason, as illustrated in FIGS. 13A and 13B, the ferromagnetic body piece VP manufactured in a unique shape (a shape having a recess at the center of the surface facing the rotor electrode 212) using iron or the like is disposed around the rotor electrode 212. In this case, since the ferromagnetic body piece VP is not magnetized at first, the arrangement work is easy. In addition, since the ferromagnetic body V is disposed on the surface opposite to the surface of the magnet M that pulls the electrode, this is effective in forming a magnetic circuit.

Figure 14:
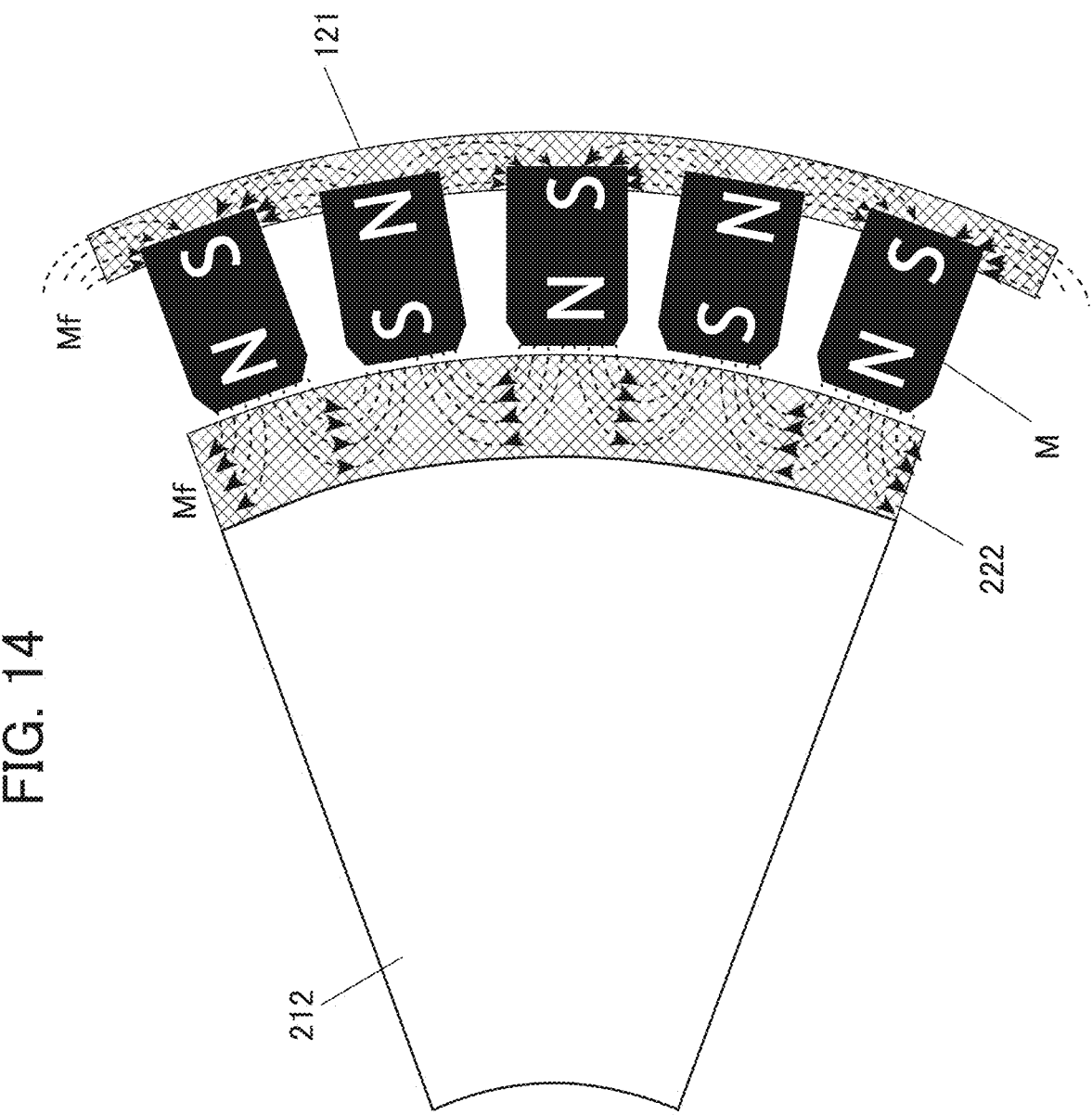
FIG. 14 is an enlarged plan view illustrating a case where a magnet is disposed around a rotor electrode in which only an outer peripheral section is formed of a ferromagnetic body and the other section is formed of a non-magnetic body.

Next, a specific example of a case where the magnet M is disposed around the rotor electrode 212 will be described with reference to FIG. 14. FIG. 14 is an enlarged plan view illustrating a case where the magnet M is disposed around the rotor electrode 212 in which only an outer peripheral section 222 is formed of a ferromagnetic body and the other section is formed of a non-magnetic body.

As illustrated in FIG. 14, a support 121 formed of a ferromagnetic body is attached to the stator spacer 111, and a part of the magnet M is fixed to the support 121 so as to be embedded therein. In addition, the magnet M is disposed so as to have a polarity opposite to that of the adjacent magnet M, and the rotor electrode 212 and the magnet M are close to each other but not in contact with each other. In this manner, a magnetic circuit is configured in which a magnetic flux Mf illustrated in FIG. 14 is formed and a strong attractive force is obtained. That is, the magnetic field emitted from the magnet M passes through the outer peripheral section 222 formed of a ferromagnetic body and enters the adjacent magnet M. By forming a short magnetic path in this manner, the attractive force can be increased. In addition, as described above, since the thickness of the rotor electrode 212 is small (for example, 0.1 mm), the rotor electrode 212 rotates while receiving a magnetic field, but has a structure in which eddy current is very small. Therefore, the generation of negative torque by the eddy current is very small.

Here, in the example illustrated in FIG. 14, the rotor electrode 212 is not entirely formed of a ferromagnetic body, and only the outer peripheral section 222 is formed of a ferromagnetic body. The reason is as follows. That is, this is because the rotor electrode 212 needs to be a ferromagnetic body in order for the magnet M to attract the end of the rotor electrode 212, but the rotor electrode 212 is preferably a non-magnetic body when operating as an electrode. Specifically, the ferromagnetic body has a small skin depth, so that current flows only in the film portion, and the resistance increases. In order to prevent this, it is preferable that a section other than the outer peripheral section 222 is formed of a non-magnetic body.

FIG. 15 is an enlarged plan view illustrating a case where a thin ferromagnetic body piece VP corresponding to a multilayer electrode is inserted into the stator spacer 111 and the magnet M is attached last.

The rotor side rotates in the direction of the arrow with a point CR as the center. With the configuration illustrated in FIG. 15, a force for attracting the rotor electrode 212 can be applied. Here, when the ferromagnetic body piece VP is disposed in front of the magnet M (on the rotor electrode 212 side), the attractive force of the magnet M may be reduced, but the ferromagnetic body piece VP is easier to process than the magnet M. For example, although there is a limit to processing the magnet M to be thin, the ferromagnetic body piece VP can be easily processed to be thin. As described above, a case where the ferromagnetic body piece VP is disposed in front of the magnet M (on the rotor electrode 212 side) and a case where the ferromagnetic body piece VP is not disposed have advantages and disadvantages in terms of securing the attractive force and easiness of processing. Therefore, either one can be selected according to the application.

Figure 16:
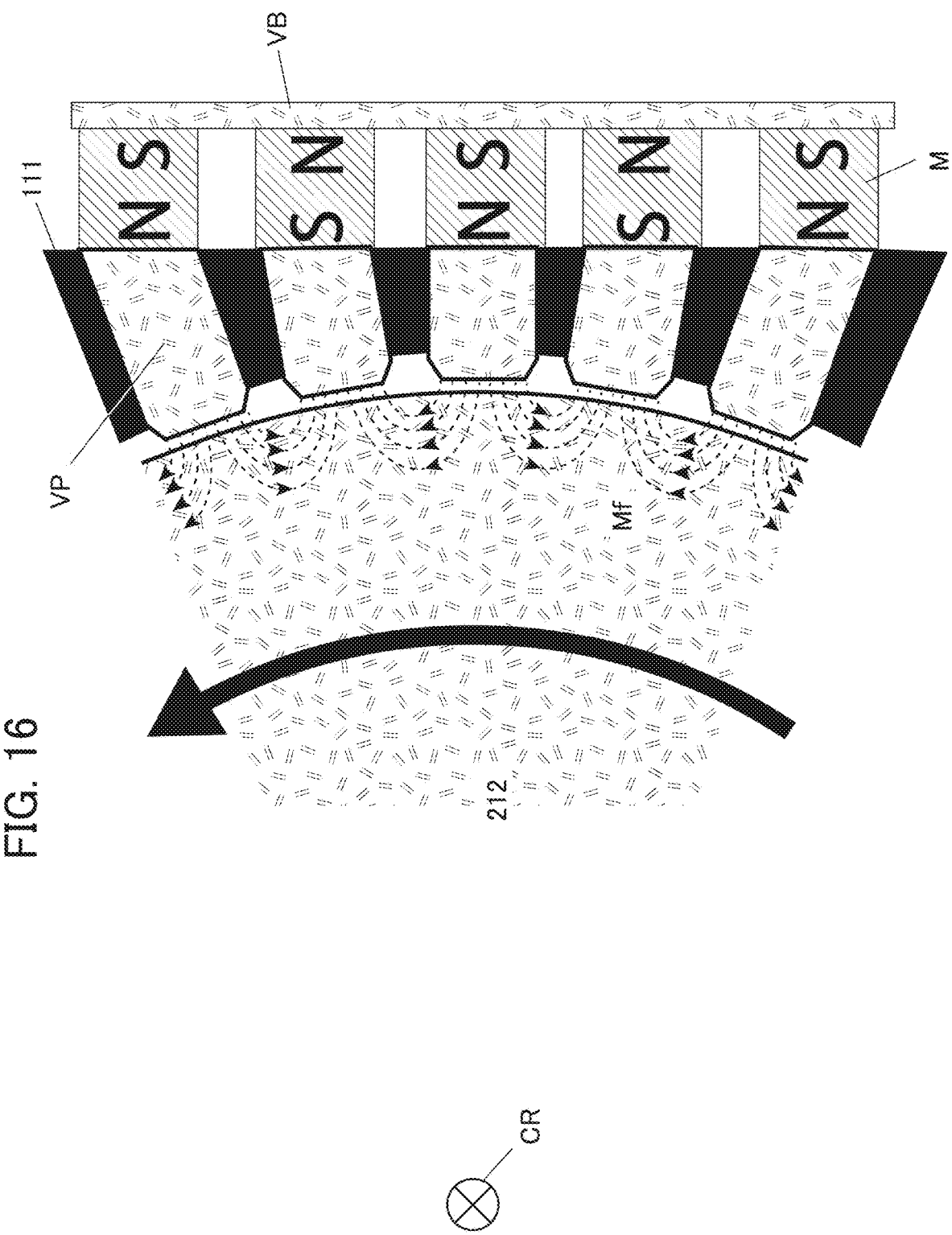
FIG. 16 is an enlarged plan view illustrating a method of attaching a ferromagnetic body piece to a stator spacer in advance and stacking this.

FIG. 16 is an enlarged plan view illustrating a method of attaching the ferromagnetic body piece VP to the stator spacer 111 in advance and stacking this.

As illustrated in FIG. 16, the stator spacer 111 to which the ferromagnetic body piece VP is attached is stacked and hardened by a laser welding machine or the like and then the magnet M is attached, and finally, a bridge VB of the ferromagnetic body is attached to the magnet M so that the magnetic flux Mf is efficiently formed. Thus, disposing the bridge VB of the ferromagnetic body on the surface opposite to the surface of the magnet M that pulls the electrode is effective in forming a magnetic circuit. In addition, when the magnet M is disposed so that a magnetic path is formed by making the magnetic flux Mf pass through the magnet M, it is not necessary to dispose the bridge VB of the ferromagnetic body on the surface opposite to the surface of the magnet M that pulls the electrode.

FIGS. 17A to 17D are enlarged plan views illustrating configuration examples of a material of the rotor electrode 212.

Figure 17A:
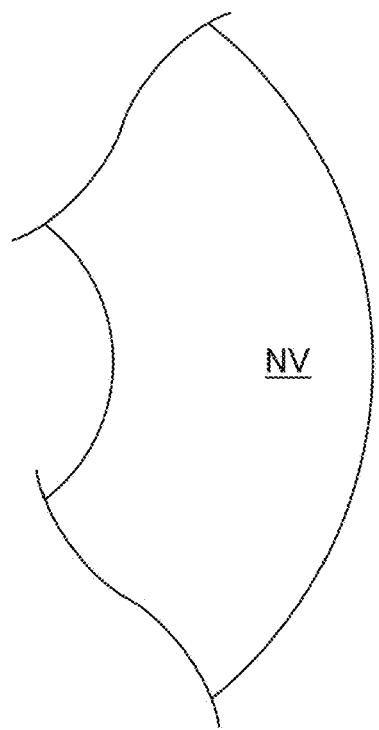
FIG. 17A is a diagram illustrating a case where an entire rotor electrode is formed of a non-magnetic body.
Figure 17B:
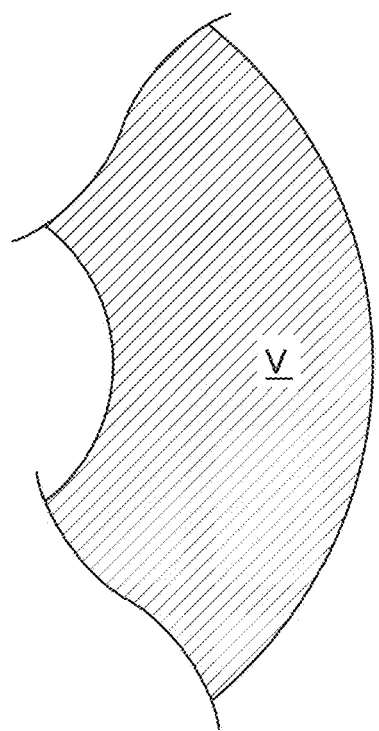
FIG. 17B is a diagram illustrating a case where an entire rotor electrode is formed of a ferromagnetic body.
Figure 17C:
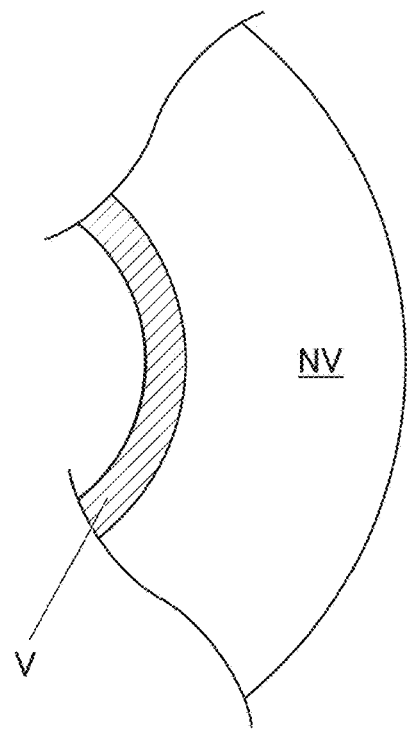
FIG. 17C is a diagram illustrating a case where only an inner end is formed of a ferromagnetic body and the other section is formed of a non-magnetic body.
Figure 17D:
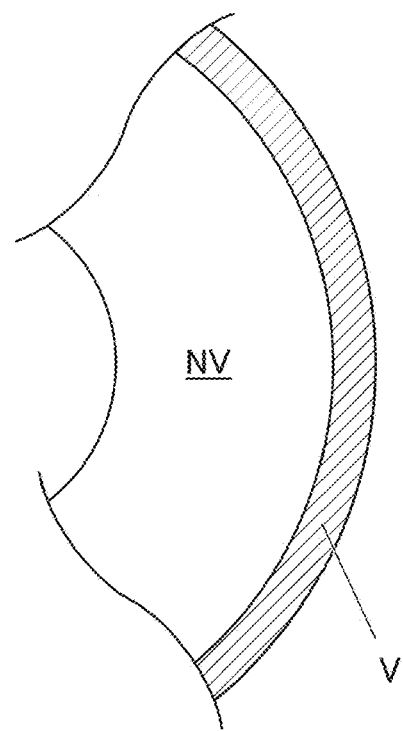
FIG. 17D is a diagram illustrating a case where only an outer peripheral section of a rotor electrode is formed of a ferromagnetic body and the other section is formed of a non-magnetic body, as in the examples illustrated in FIGS. 13A and 13B.

FIG. 17A is a diagram illustrating a case where the entire rotor electrode is formed of a non-magnetic body NV. This is a configuration example that can be adopted when it is not necessary to be attracted by the magnet M. FIG. 17B is a diagram illustrating a case where the entire rotor electrode is formed of the ferromagnetic body V. In this case, the rotor electrode is attracted by the magnet M, but is affected by skin depth if the transmitted electric power is large. For this reason, this is a configuration example that can be adopted when the transmission electric power is not large. FIG. 17C is a diagram illustrating a case where only the inner end is formed of the ferromagnetic body V and the other section is formed of the non-magnetic body NV. This is a configuration example adopted when the stator electrode 112 is attracted by using the magnet M disposed on the rotor spacer 211 side. FIG. 17D is a diagram illustrating a case where only the outer peripheral section 222 of the rotor electrode 212 is formed of the ferromagnetic body V and the other section is formed of the non-magnetic body NV, as in the examples illustrated in FIGS. 13A and 13B. This is a configuration example adopted when the rotor electrode 212 is attracted by using the magnet M disposed on the stator spacer 111 side.

Figure 18A:
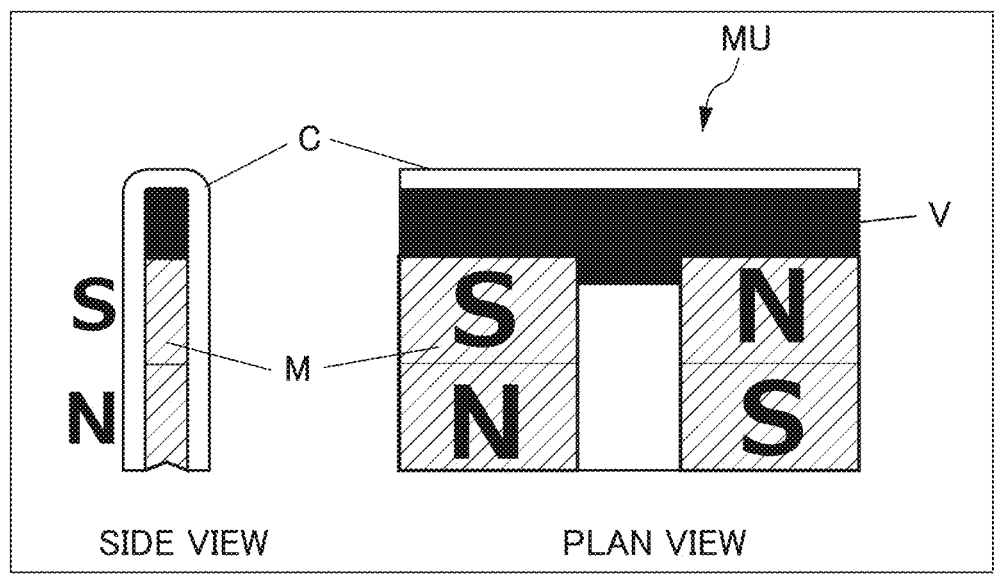
FIG. 18A is a diagram illustrating an attraction magnet unit, in which two magnets having different magnetization directions are used as a pair, and an arrangement method thereof.
Figure 18B:
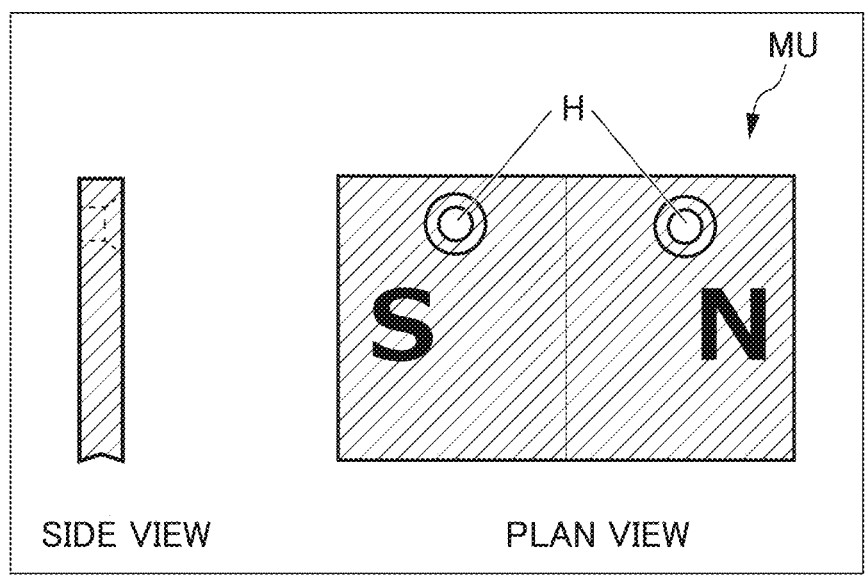
FIG. 18B is a diagram illustrating an arrangement method using an attraction magnet unit in which a fixing hole is provided.

FIGS. 18A to 18C are image diagrams illustrating an attraction magnet unit MU and an arrangement method thereof.

Although the magnet M can be arranged as in the examples illustrated in FIGS. 14 to 16, it is also possible to arrange the attraction magnet unit MU in which the magnet M is unitized. FIG. 18A is a diagram illustrating the attraction magnet unit MU, in which two magnets having different magnetization directions are used as a pair, and an arrangement method thereof. In this arrangement method, as illustrated in FIG. 18A, the ferromagnetic body V is attached to a side opposite to a side where the electrode is attracted, and the entire ferromagnetic body V is covered with a non-magnetic cover C. Thus, the rotating electrode unit 100 can be easily manufactured. FIG. 18B is a diagram illustrating an arrangement method using the attraction magnet unit MU in which a fixing hole H is provided. According to this arrangement method, as illustrated in FIG. 18B, one magnet M is arranged such that the direction of the magnetism is parallel to the end surface of the non-attraction electrode. Also in this manner, a magnetic circuit can be formed. In addition, since only one component is required for the attraction magnet unit MU, the rotating electrode unit 100 can be manufactured more easily. In addition, the arrangement of the attraction magnet units MU does not need to consider the polarity as long as a sufficient gap can be provided between the adjacent attraction magnet units MU. On the other hand, when the attraction magnet units U are brought close to each other, as illustrated in FIG. 18C, the adjacent attraction magnet units MU are arranged such that the same poles are adjacent to each other, thereby being able to obtain a large attractive force.

FIGS. 19A to 19D are diagrams illustrating a magnet belt MB and a method of using the same.

Figure 19A:
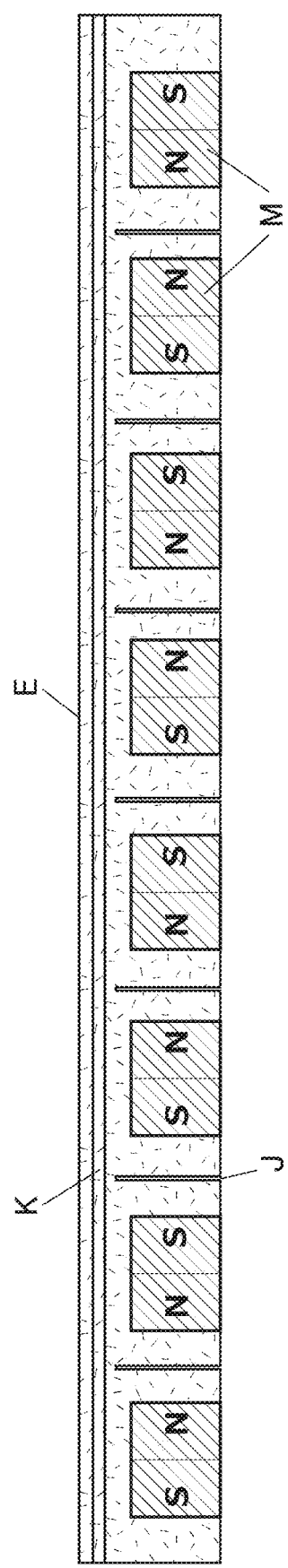
FIG. 19A is a plan view illustrating the configuration of a magnet belt.

FIG. 19A is a plan view illustrating the configuration of the magnet belt MB. Although the attraction magnet units MU can be arranged as illustrated in FIGS. 18A to 18C, it is also possible to arrange the magnet belt MB in which the magnets M disposed in consideration of the arrangement of the magnetic poles are arranged in a belt shape. Specifically, as illustrated in FIG. 19A, the magnets M disposed in consideration of the arrangement of the magnetic poles are molded with a non-magnetic and insulating material E that is slightly hard but can be bent, thereby manufacturing the magnet belt MB. Therefore, even if the radius of the rotating electrode unit 100 to be manufactured changes, the magnet belt MB can be bent in response to the change, so that it is not necessary to manufacture individual components. In addition, it is possible to save the time and effort of performing arrangement while checking the polarity as in the arrangement of the attraction magnet units MU in FIGS. 18A to 18C. As a result, the rotating electrode unit 100 can be manufactured more easily. In addition, the material E to be molded to manufacture the magnet belt MB is not particularly limited. For example, the magnet belt MB can be manufactured using a nylon-based or vinyl-based material E. In addition, a specific molding method is not particularly limited. For example, the magnet M may be put in a net knitted with a strong fiber, such as aramid or Kevlar, and molded with a resin, such as nylon.

Figure 19B:
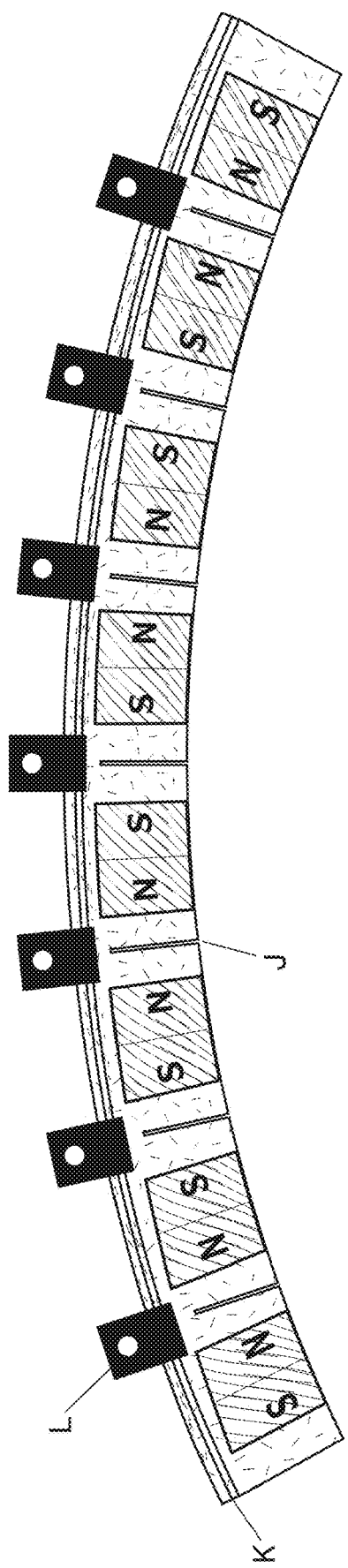
FIG. 19B is a plan view illustrating a state in which a magnet belt is bent.

FIG. 19B is a plan view illustrating a state in which the magnet belt MB is bent. In addition, the magnet belt MB illustrated in FIG. 19B is arranged on the stator spacer 111 side. However, if the bending direction is reversed, the magnet belt MB can be arranged on the rotor spacer 211 side. Here, since the material E to be molded is relatively hard, it may not be possible to bend the magnet belt MB easily, but, the magnet belt MB can be easily bent by providing a slit J as illustrated in FIGS. 19A to 19D. However, whether or not to provide the slit J is optional and not required.

Figure 19C:
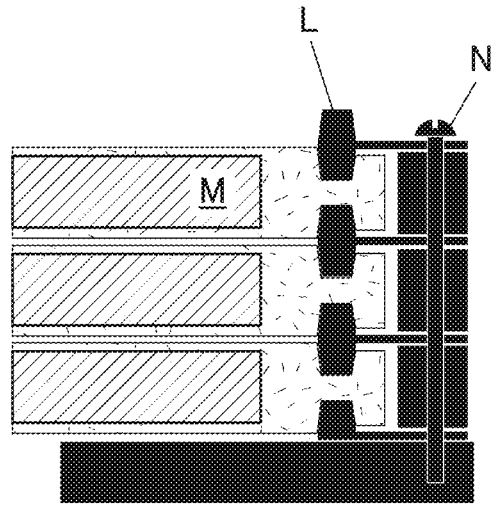
FIG. 19C is an enlarged cross-sectional view illustrating a state in which magnet belts are stacked and fixed with a belt presser.

FIG. 19C is an enlarged cross-sectional view illustrating a state in which the magnet belts MB are stacked and fixed with a belt presser L. As illustrated in FIG. 19C, a part of the belt presser L is cut into a groove K, and stacked by the required number of layers using the stator spacer 111. Therefore, the mechanical precision of the arrangement of the magnets M can be maintained.

Figure 19D:
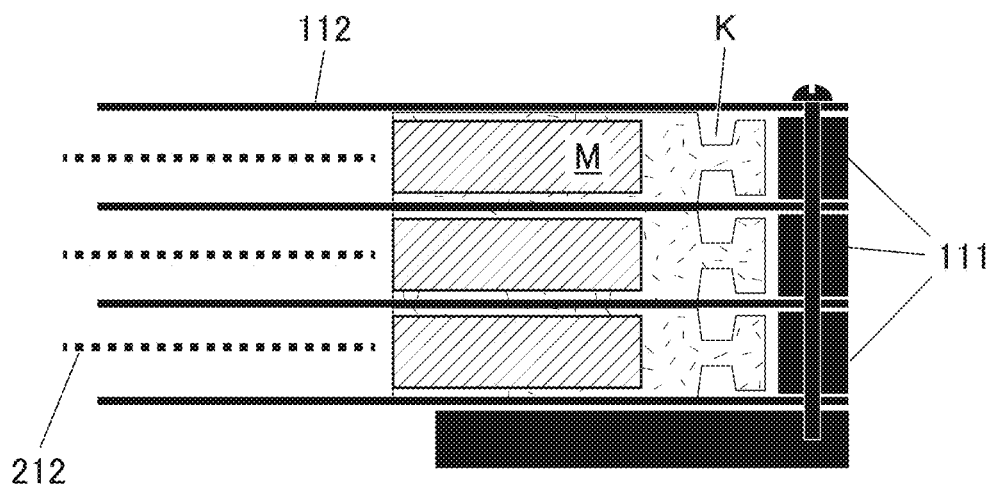
FIG. 19D is an enlarged cross-sectional view illustrating a state of a portion where there is no belt presser when magnet belts are stacked and fixed with a belt presser.

FIG. 19D is an enlarged cross-sectional view illustrating the state of a portion where there is no belt presser when the magnet belts MB are stacked and fixed with the belt presser L. As illustrated in FIG. 19D, in a portion where there is no belt presser L, the non-magnetic stator electrode 112 is inserted between the magnet belts MB, stacked by the required number of layers using the stator spacer 111, and fixed with a screw N.

Figure 20A:
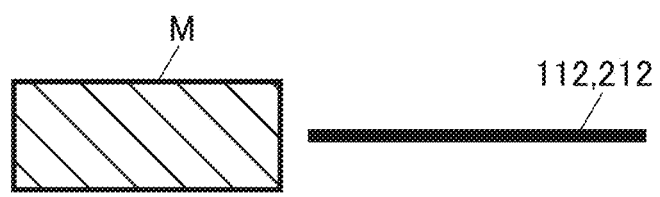
FIG. 20A is an enlarged cross-sectional view illustrating an end surface shape of a magnet.
Figure 20B:
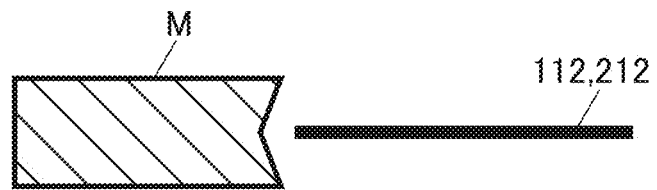
FIG. 20B is an enlarged cross-sectional view illustrating an end surface shape of a magnet.

FIGS. 20A and 20B are enlarged cross-sectional views illustrating the end surface shape of the magnet M.

When the electrode of the ferromagnetic body V (for example, the rotor electrode 212) approaches the magnet M, two forces of an attractive force acting perpendicular to the magnet attraction surface and a centripetal force for positioning the electrode (for example, the rotor electrode 212) of the ferromagnetic body V at the center of the magnet M act. These two forces act greatly in the case of a concave structure illustrated in FIG. 20B. On the other hand, in the case of a planar structure illustrated in FIG. 20A, the above-described two forces (attractive force and centripetal force) do not act greatly unlike in the concave structure, but there is an advantage that the manufacturing cost for processing is not required. In addition, when the end surface shape of the magnet M is convex, both of the above-described two forces (attractive force and centripetal force) were low.

Figure 21A:
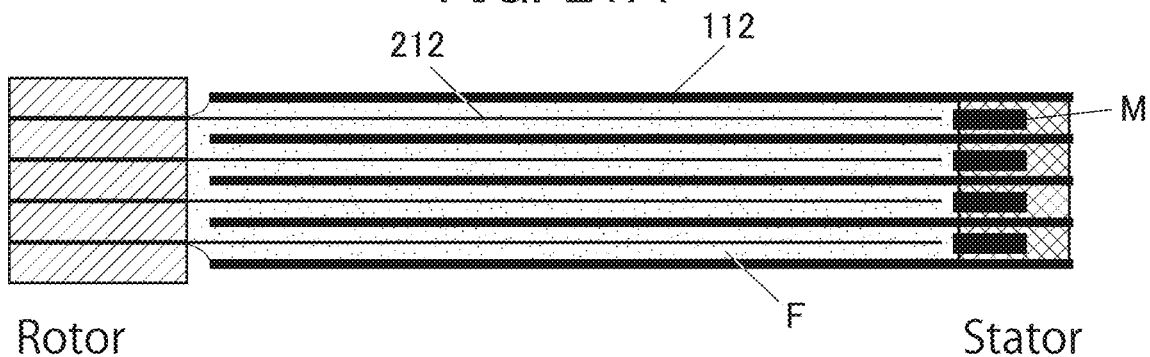
FIG. 21A is an enlarged cross-sectional view illustrating a state in which a fluid is impregnated between electrodes.
Figure 21B:
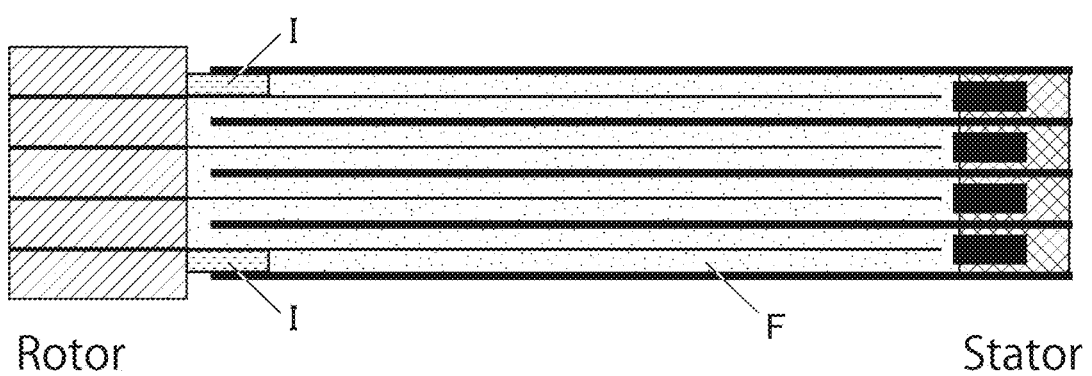
FIG. 21B is an enlarged cross-sectional view illustrating a state in which a fluid is impregnated between electrodes.
Figure 21C:
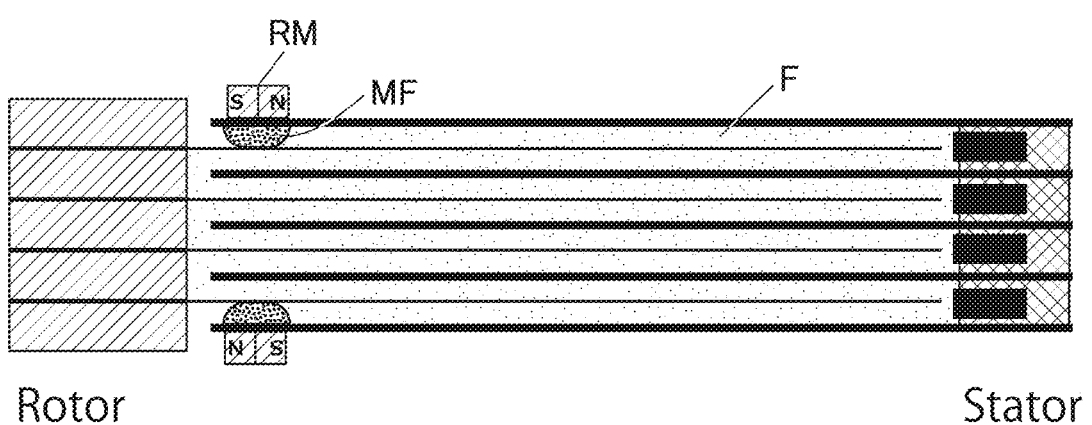
FIG. 21C is an enlarged cross-sectional view illustrating a state in which a fluid is impregnated between electrodes.

FIGS. 21A to 21C are enlarged cross-sectional views illustrating a state in which a fluid is impregnated between electrodes.

As illustrated in FIGS. 10A and 10B, a technique for flowing the fluid F between electrodes already exists. However, there is no technique for sealing the fluid F. In addition, the fluid F is not particularly limited. For example, there are oil, water, and the like. As the oil, silicone oil or the like can be used. In addition, water has a relative permittivity of 80, and is the fluid F by which the extremely large junction capacitance Cc can be formed. However, since there is a loss, care should be taken when transmission electric power should be increased. The silicone oil has a relative permittivity of about 2.8, but can withstand extreme cold to high temperatures and has a small dielectric loss. Therefore, silicone oil can be said to be the fluid F suitable for transmitting a large amount of electric power. In addition, the silicone oil is the fluid F suitable for a rotating system because of its high dielectric breakdown voltage and lubricity. In addition, it is possible to cope with high-speed rotation by using low-viscosity silicone oil. On the other hand, it is possible to provide a damper function by using high-viscosity silicone oil.

However, when water or oil is used as the fluid F impregnated between electrodes, a problem of leakage occurs, but can be solved as follows. For example, as illustrated in FIG. 21A, the metal surface is made hydrophilic or lipophilic. Therefore, since the surface tension can be increased, the oil can be sealed without sealing.

In addition, as illustrated in FIG. 21B, a ring-shaped seal ring I is used. Therefore, the gap between electrodes serving as the entrance and exit of the fluid F can be sealed. In addition, the material of the seal ring I is not particularly limited, and for example, a rubber seal can be used. In addition to these solutions, leakage of the fluid F can be prevented by the following three methods. That is, first, when the fluid F is oil, an insulating mesh material such as felt is mixed with grease and fixed in a ring shape on the upper and lower ends of the multilayer electrode. As a result, oil leakage can be prevented. The second method is to mix a thickener in the mesh material. In addition, there is a method in which the viscosity of oil is automatically increased in a mesh portion to form grease and the grease is held by a mesh material. Third, when the fluid F is silicone oil, the mesh material is mixed with lead, selenium, tellurium, or the like to gel the silicone oil that has penetrated the mesh portion. The gelled silicone oil is localized in the mesh portion. As a result, leakage of the silicone oil can be prevented.

In addition, as illustrated in FIG. 21C, a ring magnet RM is disposed outside the stator electrode 112. Therefore, it is possible to seal the leakage of the fluid F along the magnetic flux between the stator electrode 112 and the rotor electrode 212 using a magnetic fluid MF. In addition, what is adopted as the magnetic fluid MF is not particularly limited. For example, mixing with an oil-based magnetic fluid that does not mix with water is possible. In this case, water can be sealed. In addition, the magnetic fluid MF based on fluorine oil can be used for sealing silicone oil by using the property that the fluorine oil does not mix with the silicone oil. Here, since the fluorine oil has a very low vapor pressure, the magnetic fluid portion does not become thin even after long-term use. This can also be used in vacuum applications.

In addition, in FIGS. 21A to 21C, one magnet ring RM for the magnetic fluid (that is, two upper and lower magnet rings) is provided. However, the magnet rings RM having different radii concentrically may be disposed in multiple layers. In addition, the sealing pressure can be increased by increasing the number of layers. In FIGS. 21A to 21C, the magnet M that attracts the rotor electrode 212 or the like may be provided all the time, or a method may be adopted in which the magnet M is used only when filling oil during manufacturing and thereafter, oil is used to separate the electrodes from each other. At this time, since the silicone oil has releasability, it is possible to prevent the electrodes from being brought close to each other. In addition, lubricity may be enhanced by mixing spherical particles (silica, fullerene, and the like) in the oil.

Figure 22A:
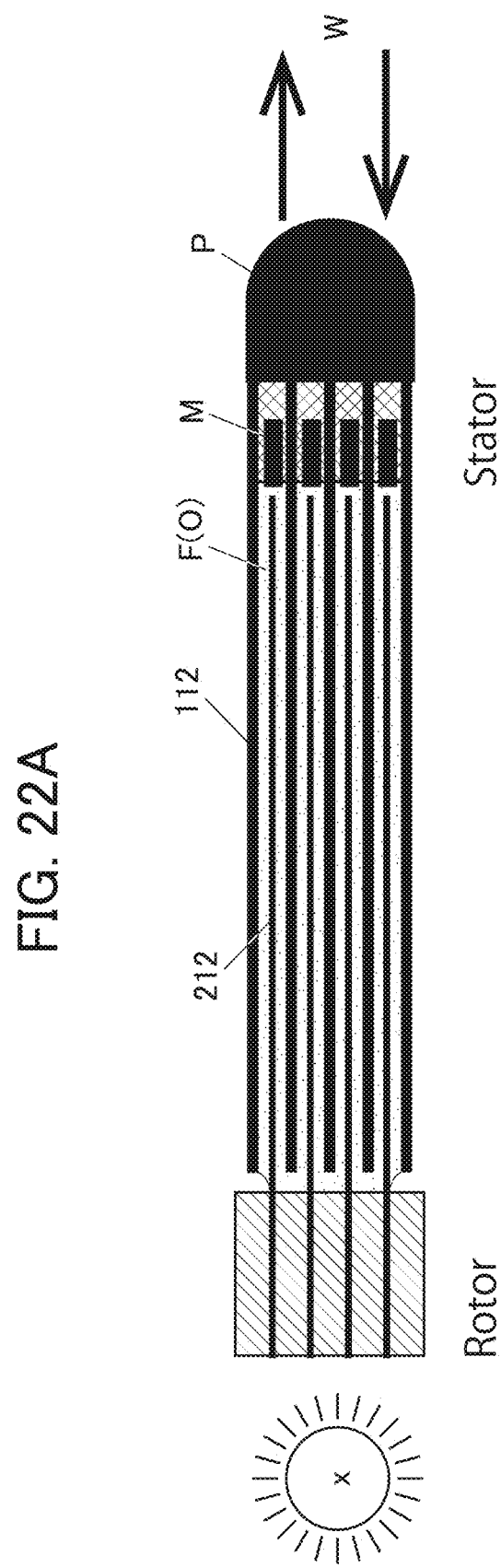
FIG. 22A is an enlarged cross-sectional view illustrating an example of a rotating electrode unit having a heat exchange function of a heat exchanger.
Figure 22C:
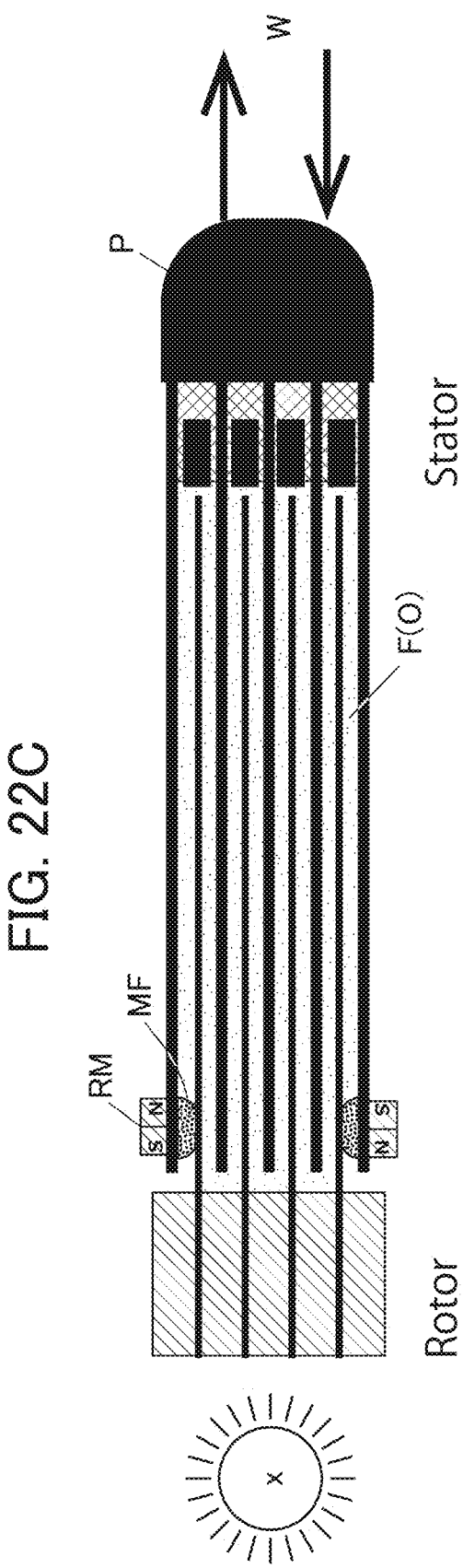
FIG. 22C is an enlarged cross-sectional view illustrating an example of a rotating electrode unit having a heat exchange function of a heat exchanger.

FIGS. 22A to 22C are enlarged cross-sectional views illustrating examples of the rotating electrode unit 100 having a heat exchange function of a heat exchanger P.

FIGS. 22A to 22C are the same as FIGS. 21A to 21C in that oil O as the fluid F is impregnated between electrodes to use the surface tension (FIG. 22A) or a seal ring (oil seal ring Q) is used for sealing as necessary (FIG. 22B). However, by using a heat conductive oil as the oil, the rotating electrode unit 100 can also be used as a heat sink.

FIG. 22C shows a state in which the heat exchange ring magnet RM that can be cooled by cooling water W is disposed outside the stator electrode 112. Thus, even if the inside of the rotor generates heat by the heat energy from a heat source X, the heat can be emitted to the outside. Conversely, the inside of the rotor can be adjusted to an optimal temperature using warm water (not illustrated) from the outside.

As described above, in order to enlarge the junction capacitance Cc formed by the rotating electrode for electric field coupling, the electrode is attracted by the magnet M, so that it is possible to maintain the non-contact property even with a large-area electrode. Therefore, a non-contact electrode for a large machine or for high-speed rotation can be manufactured. In particular, since it is not necessary to flow the fluid F in order to maintain the non-contact property, it is not necessary to provide an accessory, such as a pump, so that the reliability is improved and the cost is reduced. This further enhances the practicality of the rotating electrode unit 100, and becomes a major technical element for promoting the replacement of the slip ring.

That is, since the slip ring is a contact type, the slip ring requires maintenance and needs to be periodically replaced. However, up to several kW, it is easy to transmit electric power. Nothing that can replace this and can transmit a large amount of electric power has appeared. For example, a magnetic field type has a structure in which coils each being surrounded by a ferrite core face each other when transmitting a large power of electric power, but this is heavy and expensive and generates heat by itself. On the other hand, the electric field coupling method is advantageous in that the device itself has no heat source and accordingly is lightweight, but a rotating disk having a junction capacitance of about 1 nF that can transmit a large amount of electric power cannot be realized. For industrial use, high reliability is required. In the present invention, a magnet attraction electrode that makes this possible for the first time has been proposed. As a result, the practicability is extremely enhanced, and industrial applications are expected. In addition, this has been developed into a liquid impregnation type and a heat sink type. These can also be expected to expand the application.

Although one embodiment of the present invention has been described above, the present invention is not limited to the above-described embodiment, and modifications, improvements, and the like within a range where the object of the present invention can be achieved are included in the present invention.

For example, in the present embodiment, a disk type electrode has been described. However, as illustrated in FIG. 23, even with a cylindrical electrode, the eccentricity of the cylinder which may occur with rotation can be prevented by using the force of the magnet M.

Figure 23:
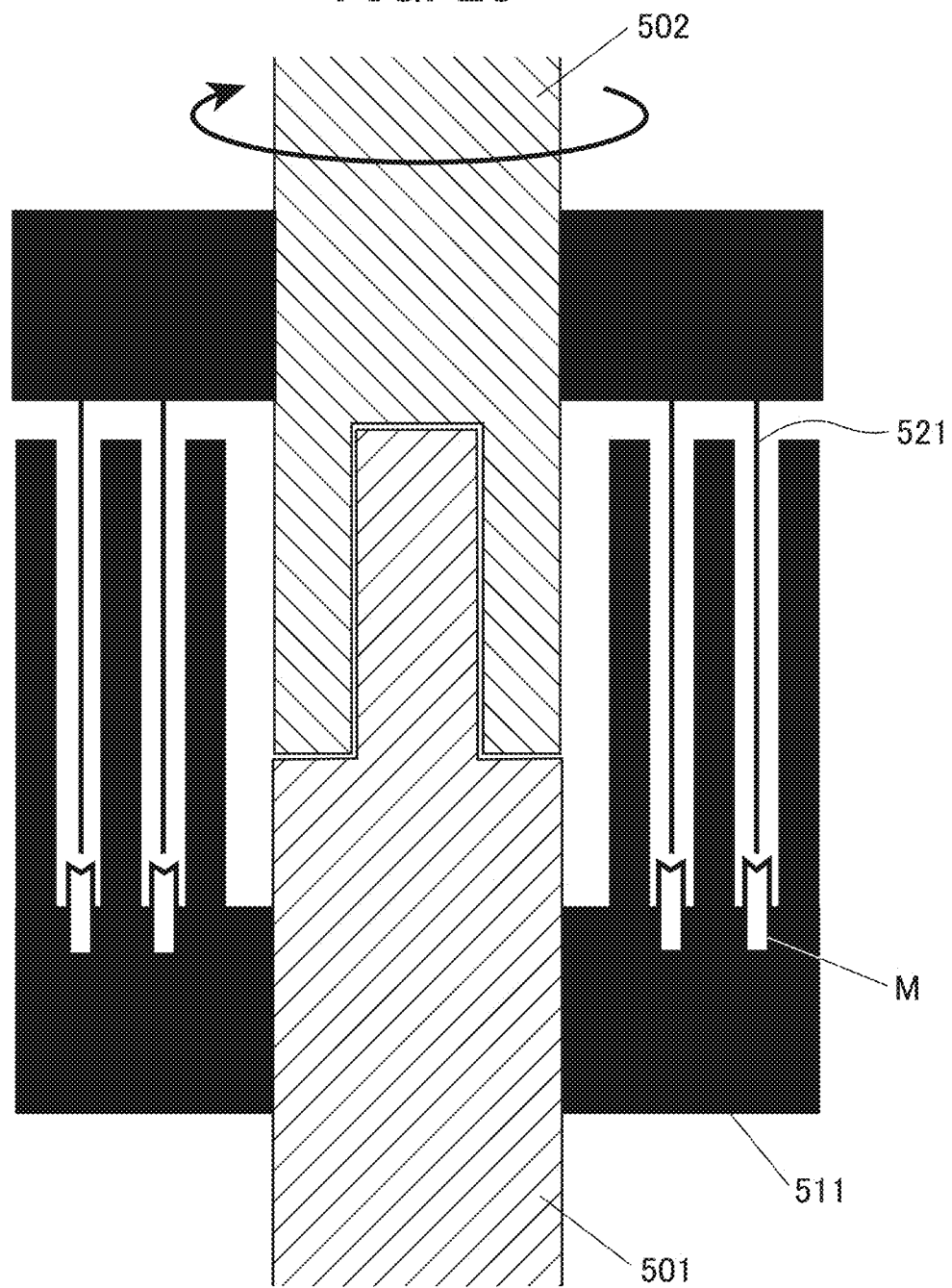
FIG. 23 is a cross-sectional view illustrating a case of a cylindrical electrode.

FIG. 23 is a cross-sectional view illustrating the case of a cylindrical electrode.

In the above example, a disk type electrode has been described. However, as illustrated in FIG. 23, even with a cylindrical electrode, the eccentricity of the cylinder that may occur with rotation can be prevented by using the force of the magnet M. In this case, as illustrated in FIG. 23, multilayer cylindrical power transmitting electrodes 511 are provided on a fixed shaft 501 side, and multilayer cylindrical power receiving electrodes 521 are provided on a rotating shaft 502 side so as to be combined with the electrodes. At this time, the electrode on the rotating shaft 502 side is formed of an ultra-thin metal of the ferromagnetic body, and the magnet M is disposed at the bottom of the electrode on the fixed shaft 501 side. Therefore, the eccentricity of the electrode on the rotating shaft 502 side can be prevented.

In addition, for example, in the present embodiment, a disk type electrode has been described. However, as illustrated in FIG. 24, the method of attracting the ultra-thin metal film of the ferromagnetic body using the magnet M can also be applied to a linear drive system.

Figure 24:
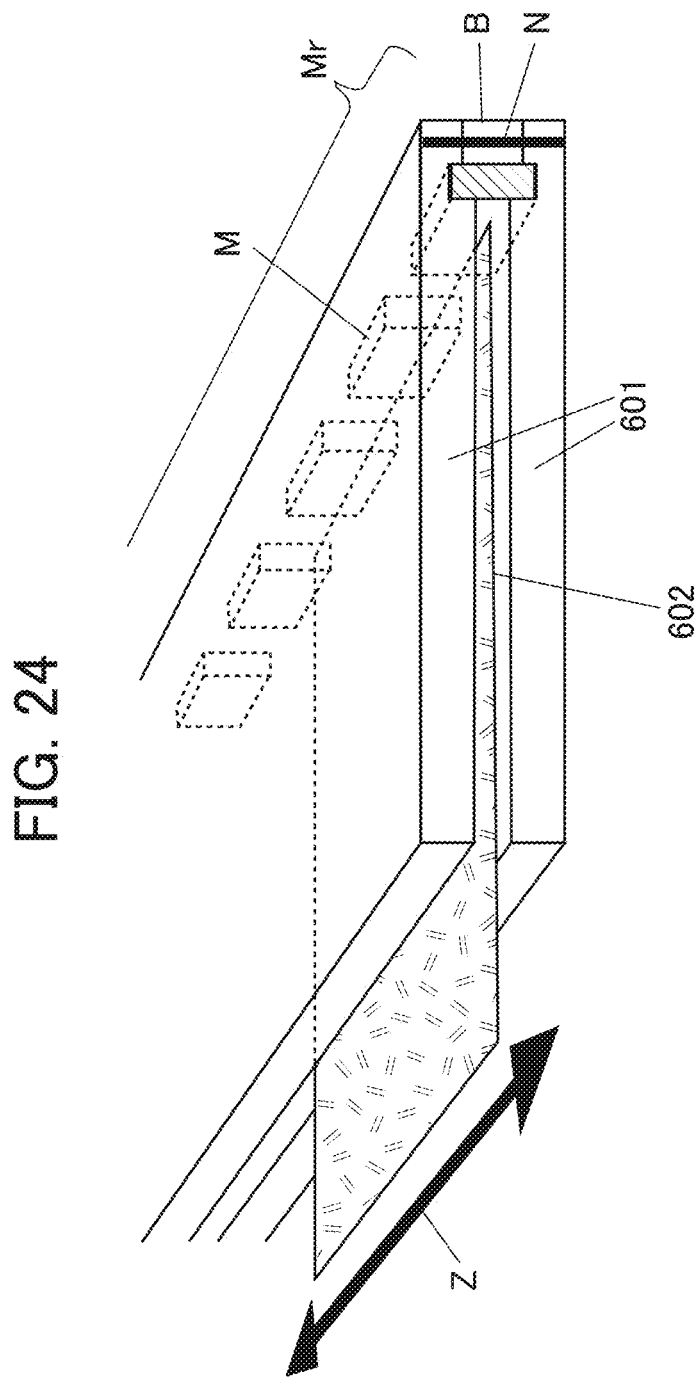
FIG. 24 is a perspective view illustrating a case of a linear drive system.

FIG. 24 is a perspective view illustrating the case of a linear drive system.

As illustrated in FIG. 24, in the linear drive system, a U-shaped electrode is prepared as a power transmitting electrode 601. Specifically, a fixing block B is disposed between the two power transmitting electrodes 601 and fixed with a screw N so as to form a U shape. As the power transmitting electrode 601, aluminum that is a non-magnetic body is used. The magnet M is periodically attached to the end of the U-shaped power transmitting electrode 601 to form a magnet row Mr. When a power receiving electrode 602 formed of a ferromagnetic ultra-thin metal is inserted into such a power transmitting electrode 601, the power receiving electrode 602 is first inserted along the power transmitting electrode. However, when the power receiving electrode 602 approaches the magnet M, the power receiving electrode 602 is attracted by the magnetic force to be in a non-contact state. In addition, when the length of the power receiving electrode 602 is slightly shorter than the distance between an attaching portion (not illustrated) of the power receiving electrode 602 and the magnet M, the power receiving electrode 602 is not in contact with the magnet M. In this manner, complete non-contact can be realized even in the extremely narrow U-shaped power transmitting electrode 601. By operation along a line direction Z in such a state, it is possible to realize a linear drive system of the large junction capacitance Cc in a completely non-contact state. In addition, although not illustrated, the magnet M and the ferromagnetic body V can be reversely attached by arranging the magnet M at the distal end of the power receiving electrode 602 and disposing the ferromagnetic body V at the center of the U-shaped fixing block B so as to face the magnet M.

In addition, for example, the magnet M in the above-described embodiment is manufactured as a product in a disposed state, and permanently keeps attracting the electrode using magnetic force, but is not limited to this configuration. The magnet M can also be disposed only in the process of manufacturing the electric power transmission system. Specifically, for example, as a method of manufacturing an electric power transmission system to which an electric field coupling power transmission technique is applied, it is possible to include a step of disposing the magnet M on the stator spacer 111 and attracting the outer peripheral section 222 of the rotor electrode 212 with a magnetic force, a step of sealing the fluid F in a gap formed between the rotor electrode 212 and the stator electrode 112, and a step of removing the magnet M disposed on the stator spacer 111. Thus, the magnet M can be used only in the manufacturing process, and the magnet M can be absent at the stage of a product. As a result, the weight and cost of the product can be reduced.

In summary, an electric power transmission system to which the present invention is applied only needs to have the following configuration, and it is possible to take various embodiments. That is, an electric power transmission system to which the present invention is applied includes a rotating electrode unit (for example, the rotating electrode unit 100) including a rotor electrode unit (for example, the rotor electrode unit 21) in which one or more rotor electrodes (for example, the rotor electrode 212) and one or more rotor spacers (for example, the rotor spacer 211) are alternately stacked and a stator electrode unit (for example, the stator electrode unit 11) in which one or more stator electrodes (for example, the stator electrode 112) and one or more stator spacers (for example, the stator spacer 111) are alternately stacked. In the rotating electrode unit, when the rotor electrode is a power transmitting electrode (for example, the stator electrode 112), the stator electrode is a power receiving electrode (for example, the rotor electrode 212), when the rotor electrode is a power receiving electrode, the stator electrode is a power transmitting electrode, the rotor electrode unit and the stator electrode unit are combined in a nesting arrangement so as to be rotatable, at least an outer peripheral section (for example, the outer peripheral section 222) of the rotor electrode is formed of a magnetic body, and the stator spacer has a magnet that attracts the outer peripheral section of the rotor electrode with a magnetic force. Thus, by pulling the end of the rotor electrode with the magnet, it is possible to solve the problem of the sag of the rotor electrode due to the influence of gravity. Therefore, it is possible to stably obtain the junction capacitance of the rotating electrode such that a short circuit does not occur between electrodes. As a result, the junction capacitance can be increased.

In addition, the rotor spacer can have a magnet that attracts the outer peripheral section of the stator electrode with a magnetic force. Thus, by pulling the end of the rotor electrode with the magnet and pulling the end of the stator electrode with the magnet, it is possible to solve the problem of the sag of the electrode due to the influence of gravity. Therefore, it is possible to stably obtain the junction capacitance of the rotating electrode such that a short circuit does not occur between electrodes. As a result, the junction capacitance can be further increased.

In addition, a fluid (for example, fluid F) can be present in a gap formed between the rotor electrode and the stator electrode, and the fluid can be sealed. Thus, since the fluid can be sealed between the electrodes, the junction capacitance of the rotating electrode can be stably obtained such that a short circuit does not occur between electrodes. As a result, the junction capacitance can be further increased.

In addition, a manufacturing method for an electric power transmission system according to an aspect of the present invention is a manufacturing method for an electric power transmission system to which an electric field coupling power transmission technique is applied, which includes a rotating electrode unit including a rotor electrode unit in which one or more rotor electrodes and one or more rotor spacers are alternately stacked and a stator electrode unit in which one or more stator electrodes and one or more stator spacers are alternately stacked, and in which, in the rotating electrode unit, when the rotor electrode is a power transmitting electrode, the stator electrode is a power receiving electrode, when the rotor electrode is a power receiving electrode, the stator electrode is a power transmitting electrode, the rotor electrode unit and the stator electrode unit are combined in a nesting arrangement so as to be rotatable, and at least an outer peripheral section of the rotor electrode is formed of a magnetic body, the manufacturing method for an electric power transmission system including: a step of disposing a magnet on the stator spacer to attract the outer peripheral section of the rotor electrode with a magnetic force; a step of sealing a fluid in a gap formed between the rotor electrode and the stator electrode; and a step of removing the magnet disposed on the stator spacer. Thus, the magnet can be used only in the manufacturing process, and the magnet can be absent at the stage of a product. As a result, the weight and cost of the product can be reduced.

EXPLANATION OF REFERENCE NUMERALS

1: electric power transmission unit, 2: electric power reception unit, 11: stator electrode unit, 21: rotor electrode unit, 100: rotating electrode unit, 112: stator electrode, 111: stator spacer, 121: support formed of ferromagnetic body, 200: shaft, 211: rotor spacer, 212: rotor electrode, 222: outer peripheral section of rotor electrode, 300: insulating material, 501: rotating shaft, 502: fixed shaft, 511: cylindrical power transmitting electrode, 512: cylindrical power receiving electrode, 601: power transmitting electrode, 602: power receiving electrode, B: fixing block, C: non-magnetic cover, Cc: junction capacitance, CR: point (center of rotation), D: sag of electrode, d: distance between stator electrodes, E: material to be molded, F: fluid, G: gravity, H: fixing hole, I: seal ring, i: current, J: slit, K: groove, L: belt presser, M: magnet, MF: magnetic fluid, Mf: magnetic flux, Mr: magnet row, MU: magnet unit, N: screw, NV: non-magnetic body, O: oil, P: heat exchanger, Q: oil seal ring, R: load, RM: ring magnet, r: length of a portion where a stator electrode and a rotor electrode face each other, S: swelling of electrode, T: contact portion, V: ferromagnetic body, VB: bridge of ferromagnetic body, Vf: high-frequency electric power source, VP: ferromagnetic body piece, W: cooling water, X: heat source, Y: dielectric, Z: line direction (operation direction)

The invention claimed is:
1. An electric power transmission system to which an electric field coupling power transmission technique is applied, the electric power transmission system comprising:
a rotating electrode unit including a rotor electrode unit in which one or more rotor electrodes and one or more rotor spacers are alternately stacked and a stator electrode unit in which one or more stator electrodes and one or more stator spacers are alternately stacked,
wherein, in the rotating electrode unit,
when the rotor electrode is a power transmitting electrode, the stator electrode is a power receiving electrode,
when the rotor electrode is a power receiving electrode, the stator electrode is a power transmitting electrode,
the rotor electrode unit and the stator electrode unit are combined in a nesting arrangement so as to be rotatable,
at least an outer peripheral section of the rotor electrode is formed of a magnetic body, and
the stator spacer has a magnet that attracts the outer peripheral section of the rotor electrode with a magnetic force.
2. The electric power transmission system according to claim 1,
wherein the rotor spacer has a magnet that attracts the outer peripheral section of the stator electrode with a magnetic force.
3. The electric power transmission system according to claim 1,
wherein a fluid is present in a gap formed between the rotor electrode and the stator electrode, and
the fluid is sealed.
4. A manufacturing method for an electric power transmission system to which an electric field coupling power transmission technique is applied, which includes a rotating electrode unit including a rotor electrode unit in which one or more rotor electrodes and one or more rotor spacers are alternately stacked and a stator electrode unit in which one or more stator electrodes and one or more stator spacers are alternately stacked, and in which, in the rotating electrode unit, when the rotor electrode is a power transmitting electrode, the stator electrode is a power receiving electrode, when the rotor electrode is a power receiving electrode, the stator electrode is a power transmitting electrode, the rotor electrode unit and the stator electrode unit are combined in a nesting arrangement so as to be rotatable, and at least an outer peripheral section of the rotor electrode is formed of a magnetic body, the manufacturing method for an electric power transmission system comprising:
a step of disposing a magnet on the stator spacer to attract the outer peripheral section of the rotor electrode with a magnetic force;
a step of sealing a fluid in a gap formed between the rotor electrode and the stator electrode; and
a step of removing the magnet disposed on the stator spacer.

* * * * *